s010400412B2

United States Patent
Stromsoe

(10) Patent No.: US 10,400,412 B2
(45) Date of Patent: Sep. 3, 2019

(54) IMPACT COMPACTOR

(71) Applicant: Roger Arnold Stromsoe, Sandton (ZA)

(72) Inventor: Roger Arnold Stromsoe, Sandton (ZA)

( * ) Notice: Subject to any disclaimer, the term of this patent is extended or adjusted under 35 U.S.C. 154(b) by 0 days.

(21) Appl. No.: 15/762,235

(22) PCT Filed: Sep. 23, 2016

(86) PCT No.: PCT/IB2016/055696
§ 371 (c)(1),
(2) Date: Mar. 22, 2018

(87) PCT Pub. No.: WO2017/051366
PCT Pub. Date: Mar. 30, 2017

(65) Prior Publication Data
US 2018/0274194 A1    Sep. 27, 2018

(30) Foreign Application Priority Data

Sep. 25, 2015  (ZA) ................................ 2015/07130

(51) Int. Cl.
*E01C 19/26* (2006.01)
*E02D 3/026* (2006.01)
(Continued)

(52) U.S. Cl.
CPC ............. *E02D 3/026* (2013.01); *B60D 1/249* (2013.01); *E01C 19/235* (2013.01);
(Continued)

(58) Field of Classification Search
CPC . E01C 19/23; E01C 19/28; E02D 3/02; E02D 3/026
(Continued)

(56) References Cited

U.S. PATENT DOCUMENTS 3,788,757 A * 1/1974 Berrange .................. E02D 3/02
404/124
3,950,110 A * 4/1976 Clifford .................. E02D 3/026
404/124
(Continued)

FOREIGN PATENT DOCUMENTS

JP        S4815705 U    2/1973

OTHER PUBLICATIONS

International Search Report PCT/ISA/210 for International Application No. PCT/IB2016/055696 dated Nov. 23, 2016.
(Continued)

*Primary Examiner* — Thomas B Will
*Assistant Examiner* — Katherine J Chu
(74) *Attorney, Agent, or Firm* — Harness, Dickey & Pierce, P.L.C.

(57) ABSTRACT

The impact compactor includes a damping arrangement which is connected between the first and second parts and which is configured to provide a damping function for the relative movement between the first and second parts. The damping arrangement includes an outer tubular member which defines a non-circular inner channel/passage; a non-circular inner shaft member which defines a first axis of rotation and which is positioned, at least partially, in the channel/passage defined by the outer tubular member; and at least one wedge formation which is wedged between the shaft member and the tubular member. The wedge formation is at least partially resiliently deformable and is configured to resist/oppose relative rotation between the shaft member and the tubular member about the first axis of rotation. One of the members is connected to the first part, while the other member is connected to the second part.

18 Claims, 24 Drawing Sheets

(51) Int. Cl.
*E01C 19/23* (2006.01)
*B60D 1/24* (2006.01)
*F16F 1/36* (2006.01)

(52) U.S. Cl.
CPC ............ *E01C 19/236* (2013.01); *E01C 19/26* (2013.01); *E01C 19/264* (2013.01); *E01C 19/266* (2013.01); *F16F 1/36* (2013.01); *F16F 2224/025* (2013.01)

(58) Field of Classification Search
USPC .................................. 404/122, 124; 405/271
See application file for complete search history.

(56) References Cited

U.S. PATENT DOCUMENTS

| | | | | |
|---|---|---|---|---|
| 3,966,346 A * | 6/1976 | Berrange | ................ | E02D 3/026 404/124 |
| 5,562,365 A | 10/1996 | Berrange | | |
| 6,379,081 B1 * | 4/2002 | Barbulescu | ............ | A01B 29/04 404/122 |
| 6,843,615 B1 * | 1/2005 | Cook | ...................... | E02D 3/026 404/122 |
| 7,334,964 B1 * | 2/2008 | Brown, Sr. | ........... | E01C 19/266 404/126 |
| 7,410,323 B1 * | 8/2008 | Roth | ..................... | E01C 19/235 404/132 |
| 7,614,821 B2 * | 11/2009 | Stromsoe | ................ | E02D 3/026 404/126 |
| 8,007,200 B2 * | 8/2011 | Brockway | ............... | E02D 3/039 172/817 |
| 10,018,611 B2 * | 7/2018 | Stromsoe | .................. | E02D 1/02 |

OTHER PUBLICATIONS

International Preliminary Report on Patentability PCT/IPEA/409 for International Application No. PCT/IB2016/055696 dated Jan. 19, 2018.

* cited by examiner

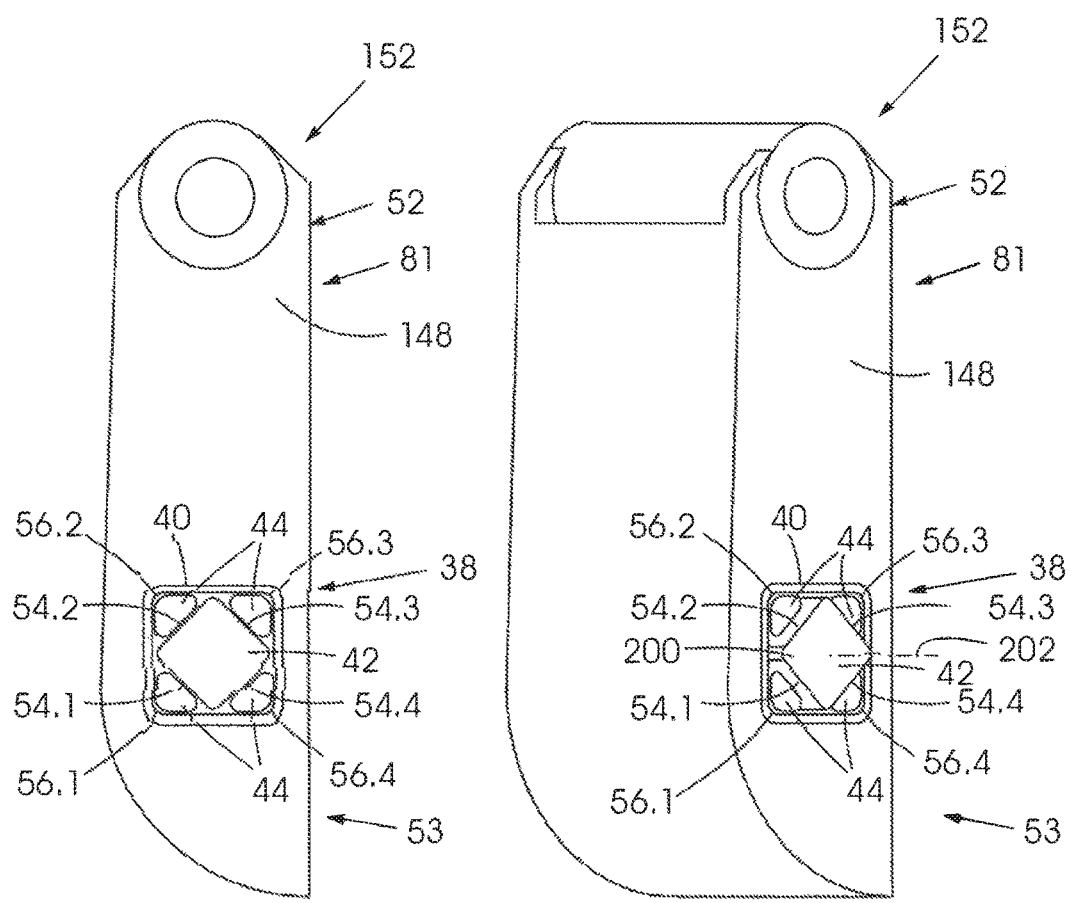

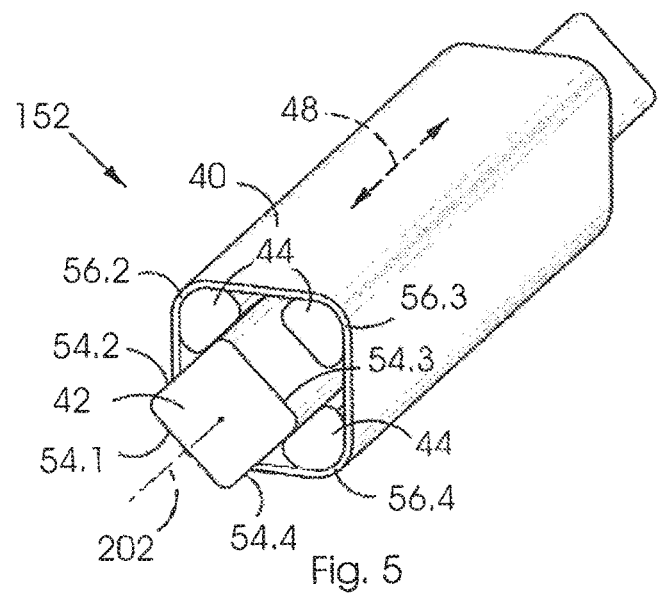
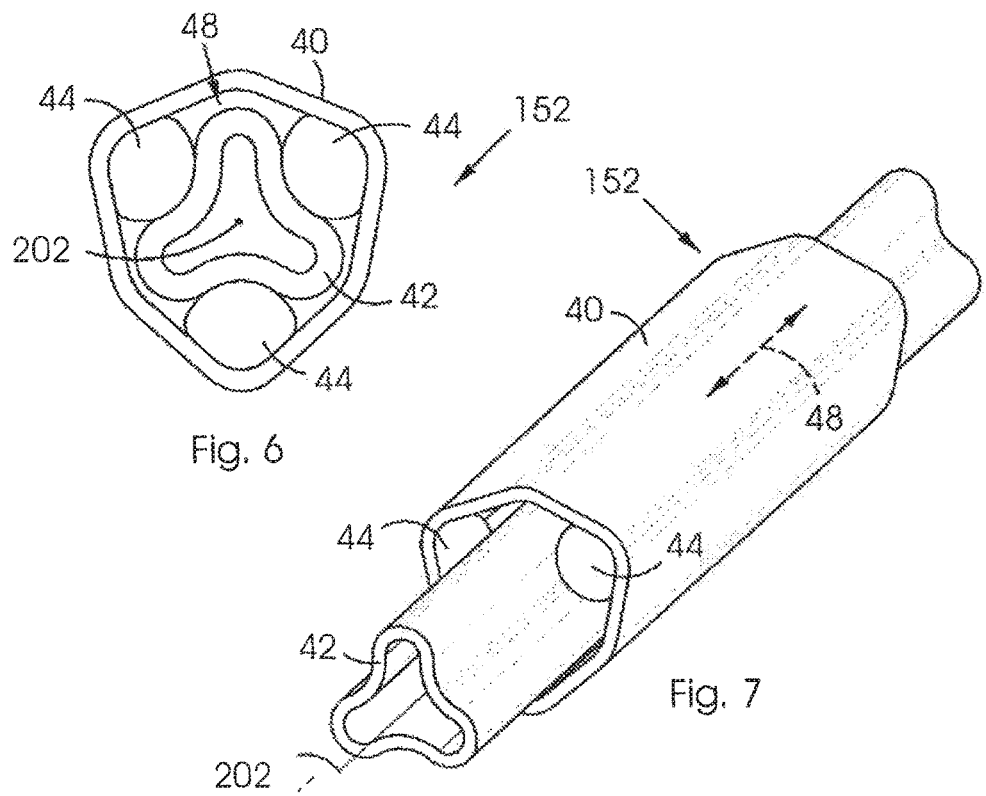
Fig. 5
Fig. 6
Fig. 7

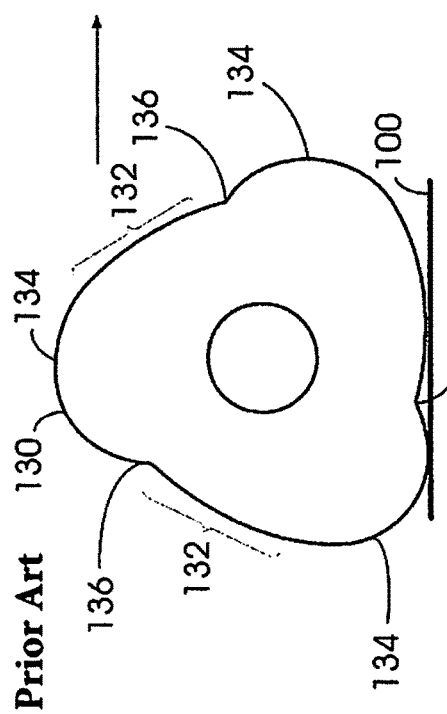
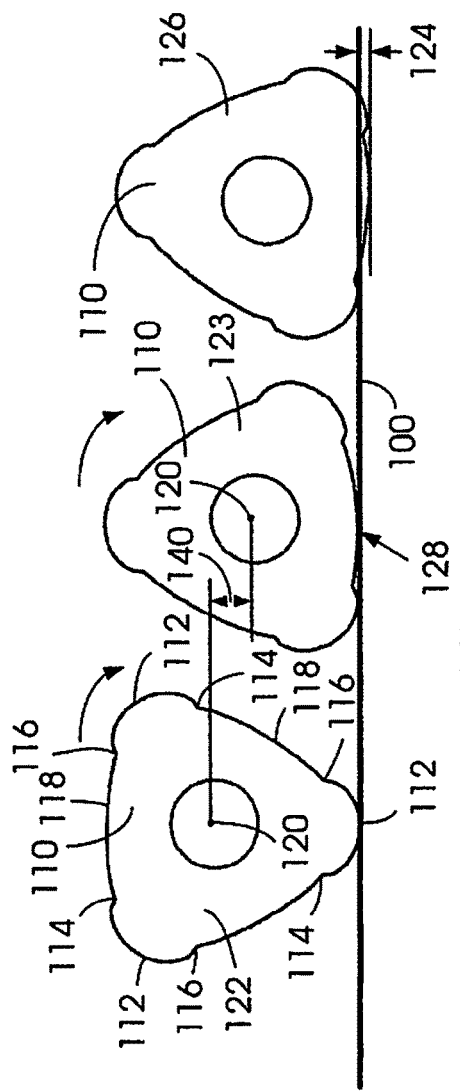
Fig. 12a
Prior Art
Fig. 12b

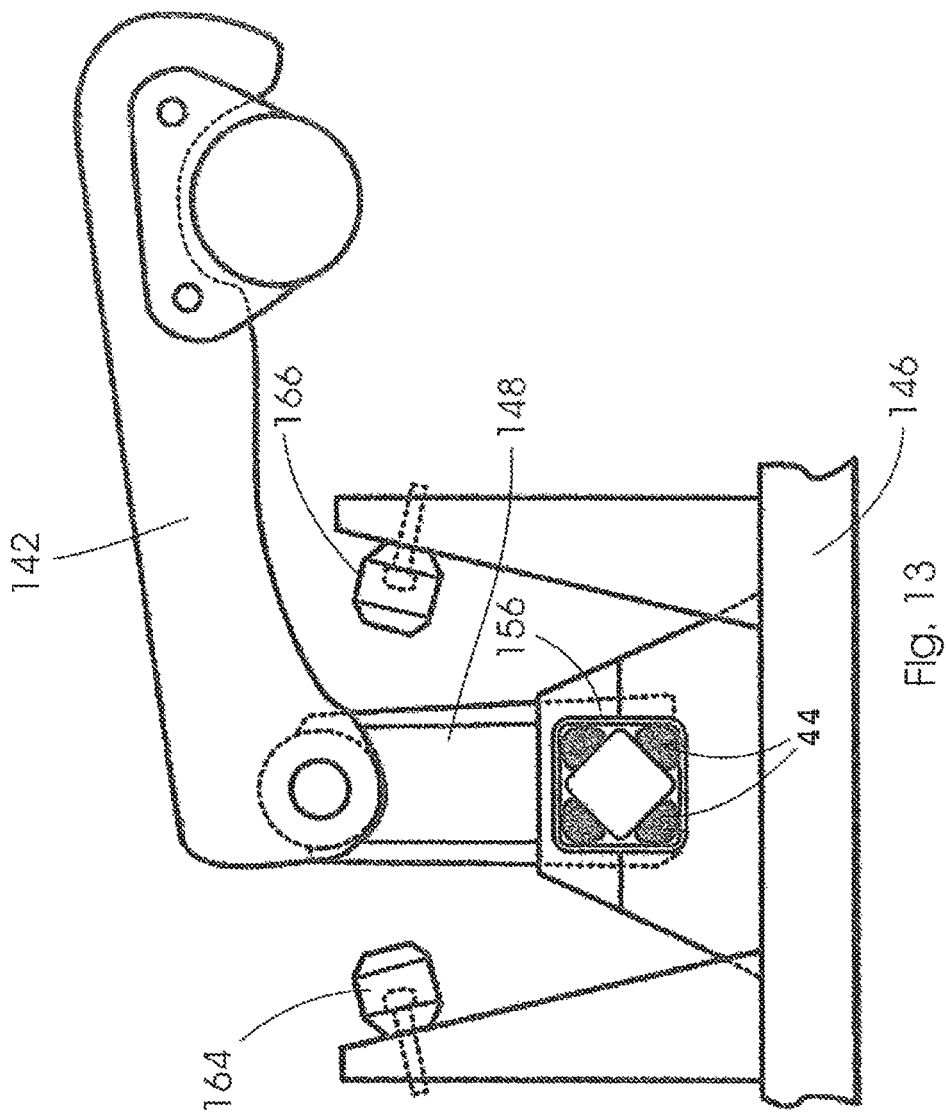

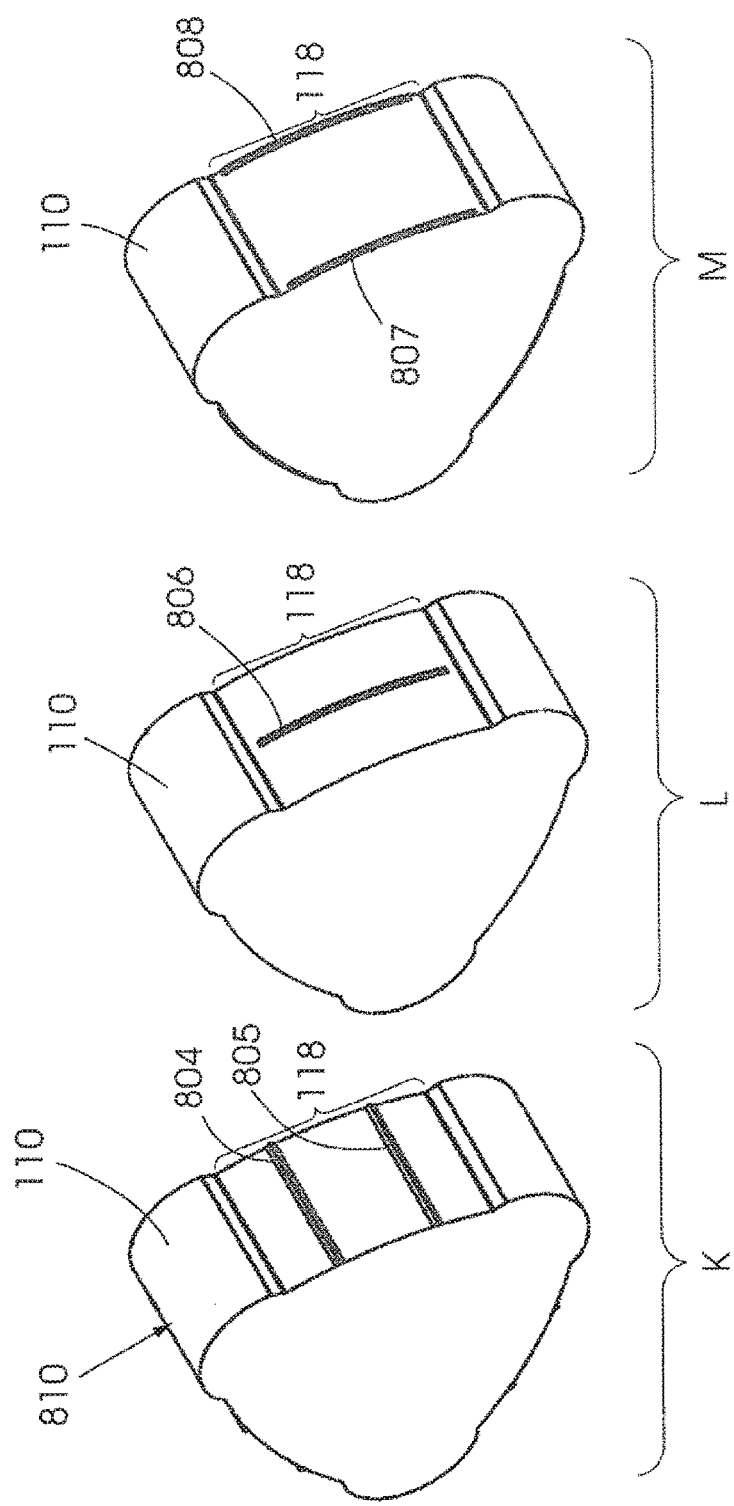

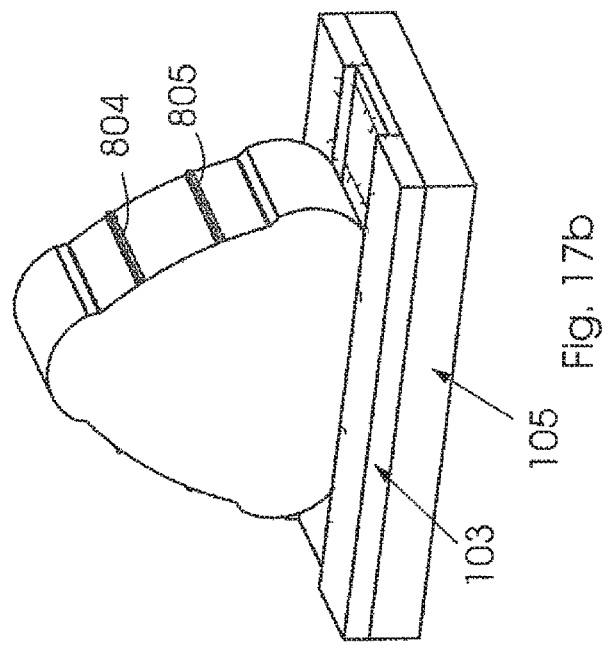
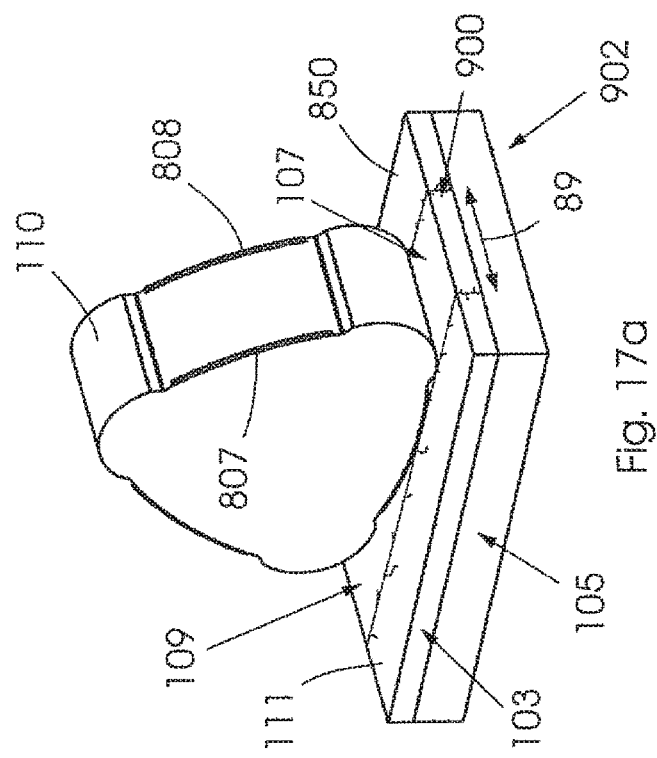

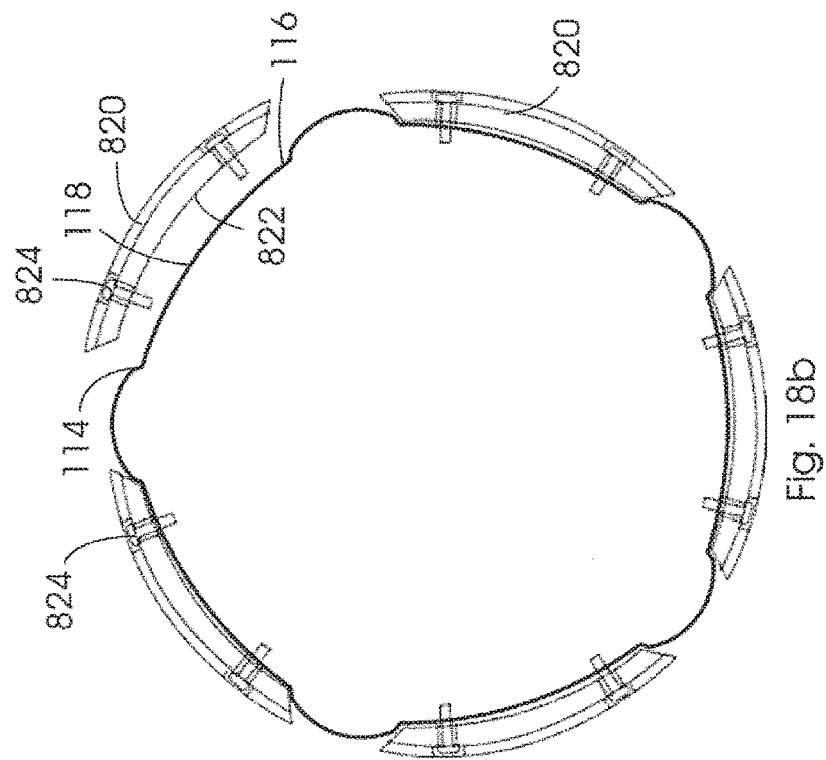
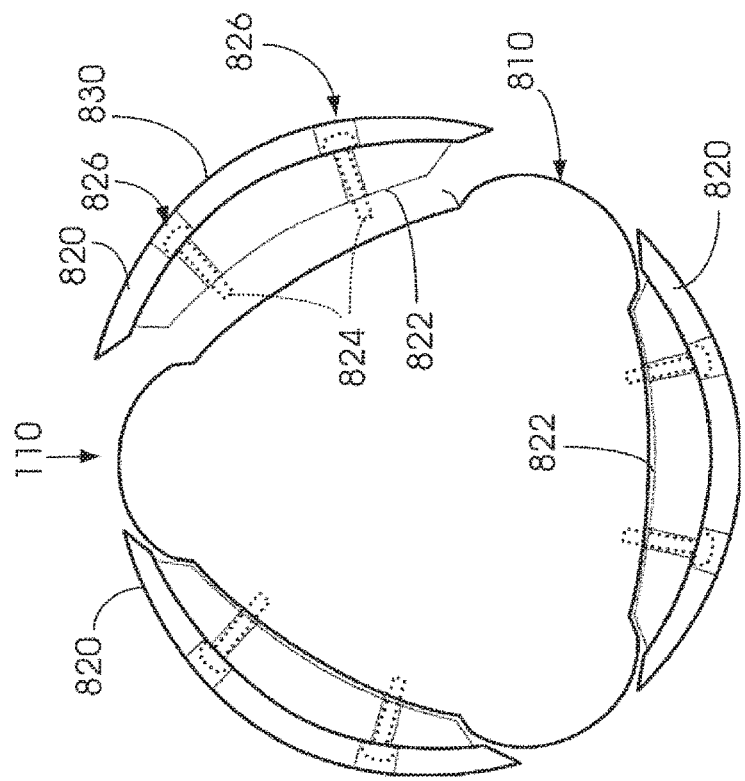

IMPACT COMPACTOR

CROSS-REFERENCE TO RELATED APPLICATIONS

This application is a national phase under 35 U.S.C. § 371 of PCT International Application No. PCT/IB2016/055696 which has an International filing date of Sep. 23, 2016, which claims priority to South African Application No. 2015/07130, filed Sep. 25, 2015, the entire contents of each of which are hereby incorporated by reference.

FIELD OF INVENTION

This invention relates to an impact compactor or impact roller.

BACKGROUND OF INVENTION

The term "impact compactor" typically refers to a soil compaction device which includes one/two impact compactor drum/s of non-round shape which, when towed/driven over a soil surface, produces a series of periodic impact blows on the soil surface. These periodic blows compact the soil which results in packing and orientating the soil into a more dense and effective particle arrangement, which reduces air voids and prevents further densification and shear failure of the soil.

The impact compactor drum/s of the impact compactor each has a series of spaced apart salient points on its periphery with each such salient point followed by a compacting face. As the impact compactor is towed over the soil surface, for instance by means of a tractor, the compactor drum rises up on each salient point and then falls forwardly and downwardly as it passes over that point, with the result that the following compacting face applies an impact blow to the soil surface. The function of the impact compactor drum is therefore to store potential energy as it rises up on each salient point and then to deliver this energy as an impact blow.

Conventional impact compactors (see FIG. 10) are generally larger than vibratory rollers (see FIG. 9) and they only operate in one direction of travel with the impact compactor generally being towed by a large four-wheel drive tractor. In order to make a compaction pass in the reverse direction, such a conventional impact compactor has to be turned around through 180 degrees. In order to do so the impact compactor has to reduce speed and because of its large turning radius, make a wide turn which is frequently wider than the width of the working surface of the construction site that requires compaction. This process places severe strain on the impact compactor and its tractor; can disturb existing prepared surfaces; and wastes valuable time. When working on a typical construction site, for example a roadway, as much as 50% of the impact compactor's time may be wasted in turning movements at each end of the compaction run. Furthermore, on some construction sites, it may be impossible to turn the machine where the site is too narrow or where there is a high embankment with a narrow working surface. This limitation has historically eliminated the use of conventional uni-directional impact compactors on such sites.

In the early impact compactor design process, in order to eliminate jerk loads between the impact compactor drum and the tow tractor, it was established that a spring type of connection was needed to operate between the tow tractor and the impact compacting drum. The spring needed to operate in such a manner that after the drum axle reaches its highest point of lift above the ground surface, the axle centre should not be obstructed in its forward and downward movement by which compaction of the soil is achieved. In early machines built with coil springs or leaf springs connecting the impact compactor to the tow tractor, the traction force varied according to formula F=Rd where R is spring stiffness in Newton/mm and d the deflection of the spring. Since the traction force varies as the value of d varies with the motion of the impact compactor, there was an unacceptably large cyclical jerk on the tractor. This problem was overcome by providing a hydraulic system where a ram was activated in and out of a hydraulic cylinder, to drive fluid into an accumulator of large capacity relative to the amount of fluid displaced by the movement of the ram in and out of the cylinder. Through this system, the change in volume of the pressurising gas in the hydraulic accumulator varied only slightly over the in and out cycle of the ram. By using this system, impact compactors have been made acceptable to the construction industry because tractors are not damaged by fluctuating push and pull forces and tractor operators have a relatively smooth ride (see FIG. 10).

Although the above system works for impact compactors that can operate only in a forward direction, it cannot practically be used for an impact compactor that needs to operate in both the forward and reverse directions of travel.

Attempts have been made to design a uni-directional self-propelled dual drum impact compactor. Since these self-propelled impact compactors typically have only two driven wheels on the tractor (i.e. the front part of the self-propelled impact compactor which drives the compactor), this type of impact compactor has insufficient traction to cope with most surface conditions on construction sites, especially when travelling over non-cohesive (sandy) or over-wet soils. This presents a problem because impact compactors are frequently required to work on these types of soils.

Typically 80% of the weight of a dual drum compactor is in the drums. When the drums are lifted off the ground, the weight of the drums is supported by the pneumatic tyres that are located between the drums. On an even and level surface, the centre of gravity of the impact compactor will be above the centre between the tyres and the impact compactor should be stable. If the impact compactor travels over an uneven surface or a surface that is not level, the centre of gravity will shift and could cause the impact compactor to become unstable. The instability caused by the large proportion of weight of the drums being on the outside of the tyres results in the risk that should the centre of gravity shift too much to one side, the impact compactor may roll excessively relative to the tractor, causing the compactor drums to fall sideways and strike the ground surface. This has previously resulted in damage to the compactor and the road surface, as well as the tractor. Any deformation of the pneumatic tyres, due to the properties of the tyres allowing them to change shape when striking an object for example, would also add to the instability problem.

Conventional impact rollers may be fitted with a blade which functions to move soil displaced by the action of the impact compactor drum/s, into the indentations created by the drum blows on the soil surface. Such blades are, however, designed to work only in a forward direction in which the impact compactor operates.

An impact compactor of conventional design delivers each blow over a large area of contact with the ground surface. For that reason it does not operate effectively on tightly cemented soils, such as laterite and calcrete, nor is it particularly effective in compacting previously traffic-compacted un-surfaced gravel roads or in rehabilitating existing paved roads.

It is an aim of the present invention to provide means which will at least alleviate some of the above identified problems.

SUMMARY OF INVENTION

In accordance with a first aspect of the invention there is provided an impact compactor which includes:
- a first part on which at least one non-round compactor drum is rotatably mounted;
- a second part which is connected to, and movable relative to, the first part; and
- a damping arrangement which is connected between the first and second parts and which is configured to provide a damping function for the relative movement between the first and second parts, wherein the damping arrangement includes an outer tubular member which defines a non-circular inner channel/passage; a non-circular inner shaft member which defines a first axis of rotation and which is positioned, at least partially, in the channel/passage defined by the outer tubular member; and at least one wedge formation which is wedged between the shaft member and the tubular member, wherein the wedge formation is at least partially resiliently deformable and is configured to resist/oppose relative rotation between the shaft member and the tubular member about the first axis of rotation, and wherein one of the members is connected to the first part, while the other member is connected to the second part.

The wedge formation may be made from an elastic polymeric substance such as rubber.

The damping arrangement may include a plurality of wedge formations, which wedge formations are spaced around an outer periphery of the inner shaft member and are wedged between the inner shaft member and the outer tubular member.

The channel defined by the outer tubular member may have a polygonal shape, when seen in transverse cross-section. The channel may include three or more corners, when seen in transverse cross-section. A wedge formation may be located in one or more corners. A wedge formation may be located in at least two corners, preferably in each corner.

More specifically, the channel of the outer tubular member may be generally square, when seen in transverse cross-section. The inner shaft member may also be generally square, when seen in transverse cross-section. In this configuration, the damping arrangement may include four wedge formations which are located in respective corners of the channel. When seen in side view/transverse cross-section, the square-shaped channel of the outer tubular member and square-shaped inner shaft member may be oriented at an angle of between 30° and 45°, preferably 45°, relative to each other. Planar sides of the inner shaft member therefore face the respective corners of the channel, when seen in transverse cross-section.

Alternatively, the channel of the outer tubular member may be generally hexagonal in shape, when seen in transverse cross-section. The inner shaft member may be generally shaped in the form of a three leaf clover having three equiangularly spaced lobes, when seen in transverse cross-section. In this configuration, the damping arrangement may include three wedge formations which are located and held captive in every second corner of the channel and between adjacent lobes respectively.

The wedge formation(s) may be elongate and may extend along at least part of the length of the channel defined by the outer tubular member. Preferably, the wedge formation(s) may extend along a substantial part of the length of the channel (ideally the entire length).

The inner shaft member may either be a solid shaft or it may be tubular for at least part of its length.

The impact compactor may include:
- a chassis structure;
- a first link, wherein the at least one non-round compactor drum is pivotally mounted to the chassis structure via the first link, and wherein the compactor drum is rotatably mounted to the first link by means of a compactor drum mounting arrangement.

The first link may be configured to allow displacement of the compactor drum, relative to the chassis structure, between a lowered and a raised position. The first link may be configured to allow displacement of the compactor drum, relative to the chassis structure, between the lowered position where the compactor drum contacts/engages a ground surface and a raised position where the compactor drum is raised above/spaced from the ground surface One of the members of the damping arrangement may be connected to the chassis structure, while the other member may be connected to the first link.

The first link may be a drag link.

More specifically, the outer tubular member may be connected to the first link while the inner shaft member may be connected to the chassis structure. Alternatively the outer tubular member may be connected to the chassis structure while the inner shaft member may be connected to the first link.

In one embodiment, the damping arrangement may include a second link (hereinafter also referred to as the "drop link") and a coupling arrangement which is configured to couple the chassis structure movably to a drive unit, for driving the impact compactor along a surface, wherein the coupling arrangement is pivotally connected to the chassis structure via the second link. The second link may be spaced from the first link. More specifically, the first link may be spaced operatively rearwardly from the second link. One of the members of the damping arrangement may be connected to the second link, while the other member may be connected to the coupling arrangement or the chassis structure.

The coupling arrangement may be configured to couple the chassis structure movably to the drive unit, for driving the impact compactor along a surface, such that the chassis structure can move relative to the drive unit about a second axis. The coupling arrangement may include a restriction mechanism which is configured to restrict the relative movement between the chassis structure and the drive unit about the said second axis. The restriction mechanism may be a braking mechanism which is configured to limit the movement of the chassis structure relative to the drive unit about the second axis, when the impact compactor is in an inoperative, transport configuration. The second axis may extend along a forward driving/travel direction of the impact compactor. In other words, the braking mechanism may be configured to limit lateral (body) roll of the chassis structure. The braking mechanism may be a disk brake-type braking mechanism or a drum-type braking mechanism. In other words, the braking mechanism may include at least one disk which is mounted/secured to either the chassis structure or the drive unit, and at least one brake calliper which is secured to the other of the chassis structure or the drive unit or tow tractor, wherein the brake calliper is configured to apply a braking force to the disk in order to limit relative rotation between the chassis structure and the drive unit about the second axis. The braking mechanism may include two disks and two brake callipers.

In an alternative embodiment, the second link (hereinafter also referred to as the "drop link") may be connected to the first link and extend between, and interconnects, the first link and one of the members of the damping arrangement (i.e. the tubular member or the shaft member). The one member is therefore connected to the chassis structure while the other member is connected to the first link via the second link. More specifically, the outer tubular member may be fixed to the second link and the inner shaft member may be fixed to the chassis structure. Alternatively the outer tubular member may be fixed to the chassis structure and the inner shaft member may be connected to the second link. The second link may be pivotally connected to the drag link.

The impact compactor may also include an actuator which is operatively connected/connectable between the chassis structure and the drag link, and which is configured to displace the drag link relative to the chassis structure, in order to displace the at least one compactor drum between its lowered and raised positions.

The impact compactor may include two impact compactor drums.

The impact compactor may include at least one wheel, preferably at least one pair of wheels, on which the chassis structure is supportively mounted and by which the impact compactor is displaceable along a ground surface. The impact compactor may include a driving arrangement which is drivingly connected to the wheel in order to drive it along a surface.

The drive unit may be a tow vehicle, such as a tractor. Alternatively, the impact compactor may be self-propelled, in which case the drive unit will form part of the impact compactor.

The non-round compactor drum may include a non-round compactor drum body which is rotatable about an axis of rotation and which is shaped to produce, under its own weight, a series of impact blows on a ground surface over which it rolls, when the compactor drum is rolled in both a first direction and an opposite second direction along the ground surface. The impact compactor may therefore be a bi-directional impact compactor. The impact compactor may therefore be able/configured to operate in a first, forward direction and a second, reverse direction. A drive unit which is connected to, or forms part of, the impact compactor, may therefore pull or push the compactor drums in a forward and rearward direction.

The non-round compactor drum may be an impact compactor drum in accordance with the third aspect and/or the ninth aspect of the invention described below.

The impact compactor may include a leveller arrangement in accordance with a seventh aspect of the invention.

The damping arrangement may include at least one shock absorber which is mounted between the first and second parts of the impact compactor.

The impact compactor may include least one penetration formation which is removably mounted to the compactor drum such that when the roller rotates about an axis of rotation as it rolls over a surface, when in use, the penetration formation penetrates into the surface. The penetration formation may be elongate. The impact compactor may include a penetration plate which includes the at least one penetration formation. The impact compactor may include two or more penetration plates. The roller may be shaped such that it includes two or more salient points/portions which allow the roller, during use, to produce a series of periodic impact blows on the soil surface by rising onto a salient point and thereafter dropping/falling down in order to produce an impact blow on a surface over which it travels. The penetration formation may be located on a radially outer part of the roller which produces an impact on the surface during an impact blow. The penetration formation will then penetrate into the surface during an impact blow.

In accordance with a second aspect of the invention there is provided an impact compactor which includes:
  a chassis structure;
  at least one non-round impact compactor drum which is rotatably mounted to the chassis structure such that the compactor drum can rotate about an axis of rotation;
  at least one penetration formation which is removably mounted to the compactor drum such that when the roller rotates about an axis of rotation as it rolls over a surface, when in use, the penetration formation penetrates into the surface.

The penetration formation may be elongate.

The impact compactor may include a penetration plate which includes the at least one penetration formation. The impact compactor may include two or more penetration plates.

The roller may be shaped such that it includes two or more salient points/portions which allows the roller, during use, to produce a series of periodic impact blows on the soil surface by rising onto a salient point and thereafter dropping/falling down in order to produce an impact blow on a surface over which it travels. The penetration formation may be located on a radially outer part of the roller which produces an impact on the surface during an impact blow. The penetration formation will then penetrate into the surface during an impact blow.

In accordance with a third aspect of the invention there is provided an impact compactor drum for an impact compactor which includes:
  a non-round compactor drum body which is rotatable about an axis of rotation and which is shaped to produce, under its own weight, a series of impact blows on a ground surface over which it rolls, when the compactor drum is rolled in both a first direction and an opposite second direction along the ground surface.

The compactor drum is therefore a bi-directional compactor drum, since it can work in two directions.

The body may have a radially outer part which extends circumferentially around the axis of rotation and which, in use, engages a ground surface as it rolls there along during a surface compaction process, and wherein the outer part includes at least one salient point/portion which allows the compactor drum, during use, to produce a series of periodic impact blows on a soil surface over which it rolls by rising onto the salient point and thereafter dropping/falling down in order to produce an impact blow on the surface over which it travels.

The outer part may include a re-entrant/concave portion which follows the salient point/portion as the compactor drum rolls on the surface in the first direction in order to facilitate the production of the impact blows when the compactor drum is rolled in the first direction. The outer part may also include a re-entrant/concave portion which follows the salient point/portion as the compactor drum rolls on the surface in the second direction in order to facilitate the production of the impact blows when the compactor drum is rolled in the second direction.

A re-entrant/concave portion may therefore be located on either side of the salient point/portion in order to facilitate the production of the impact blows when the compactor drum rolls in either direction.

Each re-entrant/concave portion may immediately follow its corresponding salient point/portion.

The compactor drum body may include two or more spaced-apart salient points portions and re-entrant/concave portions which are located on either side of each salient point, in order to allow the compactor drum to produce more than one impact blow during a single 360 degree rotation.

When seen in side view along the axis of rotation, the compactor drum body may have a substantially symmetrical outer shape when viewed about a plane which is angled to extend between the axis of rotation and the, or one of the, salient point(s)/portion(s).

In accordance with a fourth aspect of the invention there is provided an impact compactor which includes:
- a chassis structure;
- at least one wheel on which the chassis structure is supportively mounted;
- at least one impact compactor drum which is mounted to the chassis structure via a roller mounting arrangement; and
- a driving arrangement which is drivingly connected to the wheel in order to drive it along a surface.

The impact compactor may include a pair of wheels on which the chassis structure is supportively mounted. The driving arrangement may be drivingly connected to the pair of wheels.

The driving arrangement may include at least one motor. Preferably, the driving arrangement may include a pair of motors, one for each wheel. The, or each, motor may be a hydraulic motor. More specifically, the, or each, motor may be a hydrostatic motor.

In accordance with a fifth aspect of the invention there is provided an impact compactor which includes:
- a chassis structure;
- at least one impact compactor drum which is mounted to the chassis structure via a roller mounting arrangement; and
- a coupling arrangement which is configured to couple the chassis structure to a drive unit, for driving the impact compactor along a surface, such that the chassis structure can move relative to the drive unit about an axis,
- wherein the coupling arrangement includes a restriction mechanism which is configured to restrict the relative movement between the chassis structure and the drive unit about the axis.

The impact compactor may include at least one wheel, preferably a pair of wheels, on which the chassis structure is supportively mounted.

The impact compactor may include two compactor drums. The compactor drums may be located outside the wheels, when seen in front view. In other words, the compactor drums may be located on respective laterally outer sides of the wheels.

The restriction mechanism may be a braking mechanism which is configured to limit the movement of the chassis structure relative to the drive unit about the axis, when the impact compactor is in an inoperative, transport configuration. The axis may extend along a forward driving/travel direction of the impact compactor. In other words, the braking mechanism may be configured to limit lateral (body) roll of the chassis structure. The braking mechanism may be a disk brake-type braking mechanism. In other words, the braking mechanism may include a disk which is mounted/ secured to either the chassis structure or the drive unit, and a brake calliper which is secured to the other of the chassis structure or the drive unit or tow tractor, wherein the brake calliper is configured to apply a braking force to the disk in order to limit relative rotation between the chassis structure and the drive unit about the axis.

The impact compactor may be a self-propelled impact compactor. In this case, the drive unit may form part of the impact compactor. Alternatively, the impact compactor may be towable by a driving unit such as a tractor. In this case, the drive unit may be separate from the impact compactor, e.g. it may be a tractor.

In accordance with a sixth aspect of the invention there is provided an impact compactor which includes:
- a chassis structure;
- a first link;
- at least one impact compactor drum which is pivotally mounted to the chassis structure via the first link and wherein the compactor drum is rotatably mounted to the link by means of a compactor drum mounting arrangement,
- a second link;
- a coupling arrangement which is configured to couple the chassis structure to a drive unit, for driving the impact compactor along a surface,
wherein the coupling arrangement is pivotally connected to the chassis structure via the second link.

The second link may be spaced from the first link. More specifically, the first link may be spaced operatively rearwardly from the second link.

The second link may be connected to the coupling arrangement and/or the chassis structure via a damping arrangement.

The damping arrangement may include:
- an outer tubular member which defines a non-circular inner channel/passage;
- a non-circular inner shaft member which defines an axis of rotation and which is positioned, at least partially, in the channel/passage defined by the outer tubular member; and
- at least one wedge formation which is wedged between the shaft member and the tubular member, wherein the wedge formation is at least partially resiliently deformable and is configured to resist/oppose relative rotation between the shaft member and the tubular member about the axis of rotation, and
wherein one of the members is connected to the second link, while the other member is connected to either the coupling arrangement or the chassis structure.

In accordance with an seventh aspect of the invention there is provided a leveller arrangement for an impact compactor, for levelling a ground surface which is compacted by an impact compactor drum of the impact compactor, wherein the leveller arrangement includes:
- a levelling member which includes a ground-engaging formation which, when mounted to the impact compactor, engages the ground surface;
- a biasing arrangement which is configured to
  - urge the ground-engaging formation in a first urging direction against/into the ground surface, when mounted to the impact compactor and when travelling in a first travelling direction, such that the formation scrapes the surface over which it travels;
  - urge the ground-engaging formation in a second urging direction against/into the ground surface, when mounted to the impact compactor and when travelling in an opposite, second travelling direction, such that the formation scrapes the surface over which it travels.

The leveller arrangement is therefore effectively configured to help level the surface when the impact compactor is travelling in both a forward and rearward direction.

The levelling member may be pivotally connected/connectable to an impact compactor. More specifically, levelling member may be pivotally connected/connectable to a chassis structure of the impact compactor. Alternatively, the levelling member may be pivotally connected to a support structure which is mounted/mountable to the chassis structure. More specifically, the first urging direction may be a first pivot direction about the pivotal connection between the levelling member and the support structure. The second urging direction may be a second pivot direction about the pivotal connection between the levelling member and the support structure. The first and second pivot directions may be opposite to each other. Alternatively, the support structure may be a chassis structure of the impact compactor.

The levelling member may be configured such that
it extends/is angled downwardly and rearwardly from the pivotal connection towards the ground surface, when mounted to the impact compactor and when the compactor travels in a forward direction, and
it extends/is angled downwardly and forwardly from the pivotal connection towards the ground surface, when mounted to the impact compactor and when the compactor travels in a rearward/reverse direction.

The biasing arrangement may include a spring. More specifically the spring may be a torsion spring.

In accordance with a eighth aspect of the invention there is provided an impact compactor which includes the leveller arrangement as mentioned above.

The leveller arrangement may be secured to a chassis structure of the impact compactor.

The leveller arrangement may include an actuator which is configured to displace the levelling member relative to the chassis structure between an inoperative, raised position in which the ground-engaging formation is spaced from a ground surface over which the impact compactor travels, when in not in use, and an operative, lowered position in which the ground-engaging formation engages the surface. In this case, the actuator may be operatively connected between the support structure of the leveller arrangement and the chassis structure. The support structure may be pivotally connected to the chassis structure.

The actuator may be a hydraulic or pneumatic actuator.

In accordance with a ninth aspect of the invention there is provided a compactor drum for an impact compactor which includes:
a non-round compactor drum body which is shaped to induce a series of impact blows on a surface over which it rolls;
at least one conversion arrangement, having a curved outer surface, which is releasably securable to the compactor drum body in order to convert the compactor drum body into a substantially round compactor roller,
wherein when the conversion arrangement is secured to the compactor drum body, the round compactor drum has a substantially circular outer shape/profile, when seen along an axis of rotation, such that the round compactor drum no longer induces periodic impact blows on the surface over which it rolls.

The compactor drum body may be shaped such that it includes two or more salient points/portions which allows the compactor drum, during use as an impact compactor, to produces a series of periodic impact blows on the soil surface by rising onto a salient point and thereafter dropping/falling down in order to produce an impact blow on a surface over which it travels.

More specifically, the impact compactor drum may include two or more conversion arrangements which are securable to the compactor drum body. Each conversion arrangement may, when secured to the compactor drum body, extend between two adjacent salient points. "Adjacent" in this instance, refers to two successive salient points which follow each other as the compactor drum body rolls over a surface.

The compactor drum may be the compactor drum in accordance with the third aspect of the invention.

In accordance with a tenth aspect of the invention there is provided a method of converting an impact compactor drum, which has a non-round shape when seen along an axis of rotation, to a non-impact compactor roller, wherein the method includes:
securing at least one conversion arrangement, having a curved outer surface, to an impact compactor drum body of the impact compactor such that the curved outer surface forms at least part of a radially outer side of the compactor drum, when seen along the axis of rotation.

More specifically, the method may include securing at least one conversion arrangement to the impact compactor drum body such that, when seen along the axis of rotation, the compactor drum has a substantially circular outer shape/profile which is formed, at least partially, by the conversion arrangement. In this configuration, the compactor drum no longer induces periodic impact blows on the surface over which it rolls.

The compactor drum body may be shaped such that it includes two or more salient points/portions which allows the compactor drum, during use as an impact compactor, to produce a series of periodic impact blows on the surface by rising onto a salient point and thereafter dropping/falling down in order to produce an impact blow on the surface over which it travels. The method may therefore include attaching a conversion arrangement to the compactor drum body such that its curved outer surface extends between two adjacent salient points. More specifically, the method may include securing a conversion arrangement in-between all the salient points such that their curved surfaces extend between the salient points in order to form a substantially circular outer shape/profile.

It will be appreciated that in each embodiment described above, the impact compactor may be self-propelled or towed.

BRIEF DESCRIPTION OF THE DRAWINGS

The invention will now be described, by way of example, with reference to the accompanying diagrammatic drawings. In the drawings:

FIG. 1b shows a schematic top view of the impact compactor of FIG. 1a;

FIG. 1c shows a schematic side view of the impact compactor of FIG. 1a;

FIG. 2b shows a schematic top view of the impact compactor of FIG. 2a;

FIG. 2c shows a schematic side view of a damping arrangement of the impact compactor of FIG. 2a;

FIG. 2d shows a schematic side view of a restriction/braking mechanism of the impact compactor of FIG. 2a;

FIG. 2f shows an end view of part of a damping arrangement of FIG. 2c;

FIG. 2g shows a three-dimensional view of the part of the damping arrangement of FIG. 2c;

FIG. 3b shows a top view of the impact compactor of FIG. 3a;

FIG. 4b shows a top view of the impact compactor of FIG. 4a;

FIG. 5 shows a three-dimensional view of part of the damping arrangement of FIG. 2c;

FIG. 6 shows an end view of an alternative embodiment of the damping arrangement of FIG. 5;

FIG. 7 shows a three-dimensional view of the damping arrangement of FIG. 6;

FIG. 12a shows a conventional uni-directional compactor drum;

FIG. 12b shows a bi-directional compactor drum in accordance with the invention, as it rolls over a soil surface;

FIG. 13 shows a schematic side view of a bi-directional damping arrangement of the impact compactor of FIG. 4a, marked as "X";

FIG. 16 shows different examples of penetration plates which are secured to a compactor drum in accordance with the invention;

FIGS. 17a&b each illustrate how the penetration plates illustrated in FIG. 16 help the compactor drum to penetrate into the ground surface;

FIG. 18a shows a schematic side view of how a conversion arrangement can be used to convert a three-sided compactor drum into a rounded compaction roller;

FIG. 18b shows a schematic side view of how a conversion arrangement can be used to convert a five-sided compactor drum into a rounded compaction roller;

DETAILED DESCRIPTION OF PREFERRED EMBODIMENT

Figure 10:
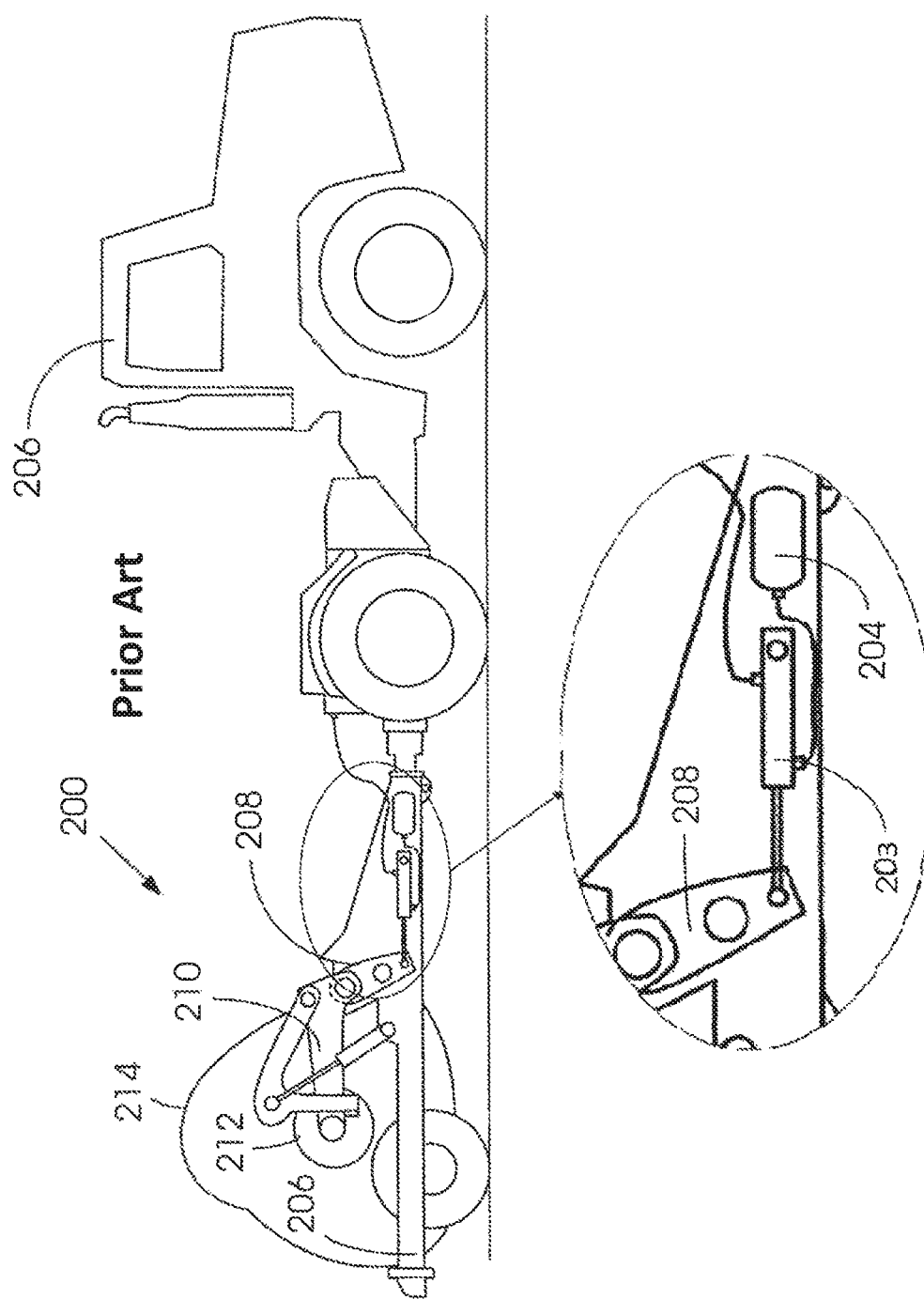
FIG. 10 shows a schematic side view of a conventional towed dual drum impact compactor, with one compactor drum removed, with an existing damping arrangement.

Conventional impact compactors 200 that operate in one direction only, have traditionally used a hydraulic damping cylinder 203 and accumulator 204 setup, in order to help prevent jerk loads between the impact compactor 200 and a tractor 206 which tows it during operation (see FIG. 10). More specifically, conventional impact compactors 200 typically includes a chassis 206, a drop link 208 which is pivotally connected to the chassis structure 206 and a drag link 210 connected between the drop link 208 and an axle assembly/compactor drum mounting arrangement 212 on which a compactor drum 214 is mounted. More specifically, the drop link 208 is typically elongate and a central part thereof is pivotally connected to the chassis structure 206. One end of the drop link 208 is pivotally connected to the drag link 210, while an opposite end thereof is connected to the hydraulic damping cylinder 203. The fore and aft movements of the compactor drum 214 cause the drop link 208 to pivot and hence it is the link that conventional impact compactors use to prevent jerk loads by pivotally connecting a hydraulic ram of the hydraulic cylinder 203 to the drop link 208, and pivotally connecting the other end of the hydraulic damping cylinder 203 to the chassis structure 206, so that when the drop link 208 pivots, the hydraulic ram moves in and out of the cylinder, sending displaced hydraulic fluid to and from the accumulator 204.

In the drawings, reference numeral 10 refers generally to an impact compactor in accordance with the invention (see FIGS. 1a, 2a, 3a and 4a, amongst others).

Impact compactors are typically designed to work only in a single direction. The standard compactor drum shape typically has a series of salient points/portions 134, followed by a re-entrant portion 136 and a smoothly curved compaction surface 132 (see FIG. 12a). This basic shape has been used continuously in the industry for both single drum and dual drum impact compactors. The compactor drums for dual drum impact compactors 130 typically have 3 (as shown in FIG. 12a) or 5 sides. The compactor drums for single drum impact compactors typically have 4 sides.

The design of the impact compacting drum 130 is based on the principle of lifting a mass and then allowing it to fall and strike the soil surface 100 with an impact blow. As a result, the compactor drums 130 are typically shaped to provide periodic impact blows when rolled specifically in only one direction. The rolling of the compactor drums 130 in an opposite direction, would therefore be ineffective on the surface 100. The bidirectional compactor drum 110 shown in FIG. 12b however addresses this problem by being effective when rolled in both a forward and reverse direction.

The compactor drum 110 has a series of salient points/portions 112 which are each flanked by two re-entrant portions 114, 116 and a smoothly curved compaction portion 118 which extends from each re-entrant portions 114 towards an adjacent re-entrant portion 116. The compactor drum 110 may consist of either three, four, five or more sides with each side effectively including a salient point 112 at both ends, two re-entrant portions 114, 116 and a compaction portion 118. The salient point 112 of the compactor drum 110 needs to be of a large enough radius so that the compactor drum 110 is able to roll efficiently onto the salient point 112 and thereafter fall forwardly and downwardly to deliver an impact blow on the soil/ground surface 100. The salient point 112 on which the compactor drum 110 rises is effectively the last point of contact between the compactor drum 110 and the soil surface 100 before the compactor drum 110 falls forwardly and downwardly in order for the surface of the compaction portion 118 to deliver an impact blow to the soil surface 100.

The manner in which the compactor drum 110 operates over a ground surface 100 is illustrated in FIG. 12b. The compactor drum 110 is shown in full outline standing on top of one of its salient points 112 (see reference numeral 122), which means that the compactor drum's 110 axis of rotation 120 is at its highest point. As the compactor drum 110 rotates clockwise, the adjacent re-entrant portion 116 helps to prevent a radially outer part of the compactor drum 110 from remaining in constant, continuous contact with the surface 100 such that point 128 of the compaction portion 118 is first to make contact with the surface 100 after rotating/pivoting over its salient point 112 (see position 123). This enables the potential energy of the compactor drum 110 to be effectively delivered as an impact blow.

Without the re-entrant portion 116 there would be a dissipation of available energy of the drum 110 by its radially outer part being in continuous contact with the soil surface 100 as it rolls forward, thereby reducing the downward acceleration of the drum 110. In such a case, the stored potential energy (when in position 122) would be dissipated over a longer time interval and the compaction force would be applied over a larger surface area, thereby reducing the effectiveness of the compactor drum 110.

As the compactor drum 110 strikes the soil surface 100 to deliver an impact blow, it will continue to move forwardly and downwardly into the surface 100 until the soil has absorbed the energy of the impact blow, bringing the downward velocity of the compactor drum 110 to zero, at which point the drum has reached its maximum penetration depth 124 and is in the maximum penetration position 126. It can be noted that the drop in height 140 as referred to in FIG. 12b is equal to the change in height of the axis 120.

Since the radially outer side of the compactor drum 110 is effectively mirrored about each salient portion 112, the compactor drum 110 will work in the same way when used in the reverse direction (i.e. when rotated in a counter clockwise direction).

In order to accommodate a bidirectional compactor drum 110, the damping arrangement of the impact compactor also needs to be bidirectional. In other words, the damping arrangement needs to work when the compactor drum 110 is rolled in both forward and reverse directions.

Figure 1A:
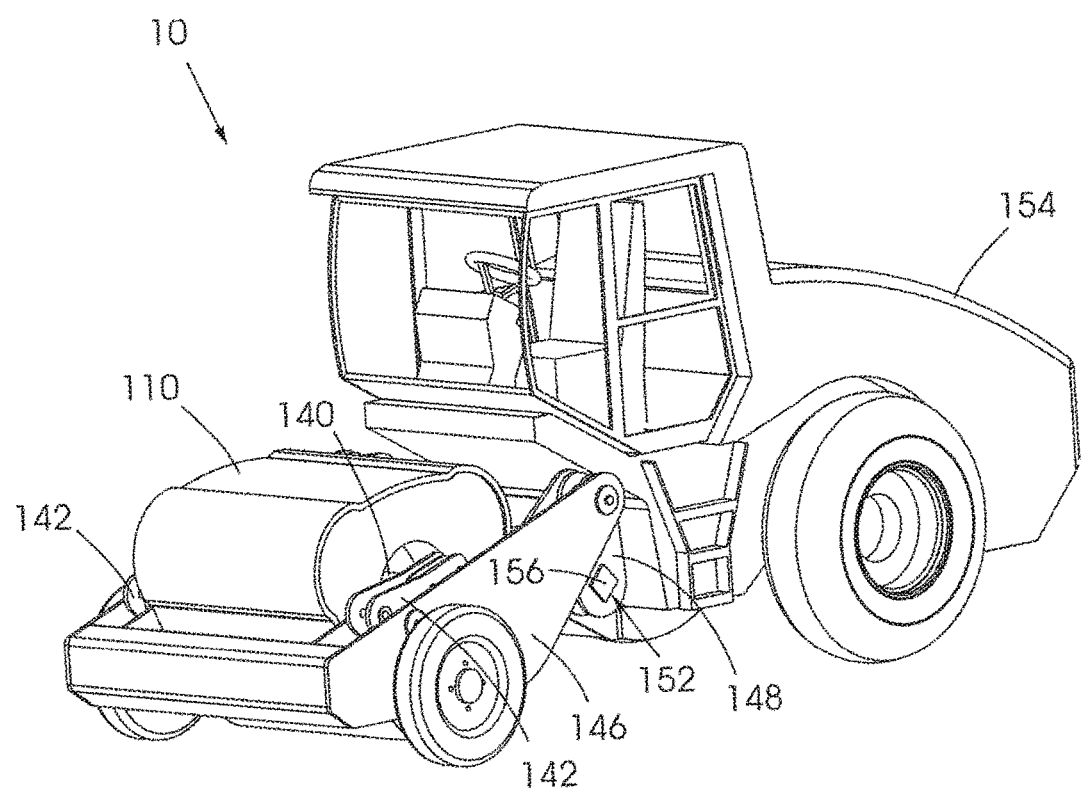
FIG. 1a shows a schematic three-dimensional view of an impact compactor in accordance with the invention, which is self-propelled and bi-directional.
Figure 1B:
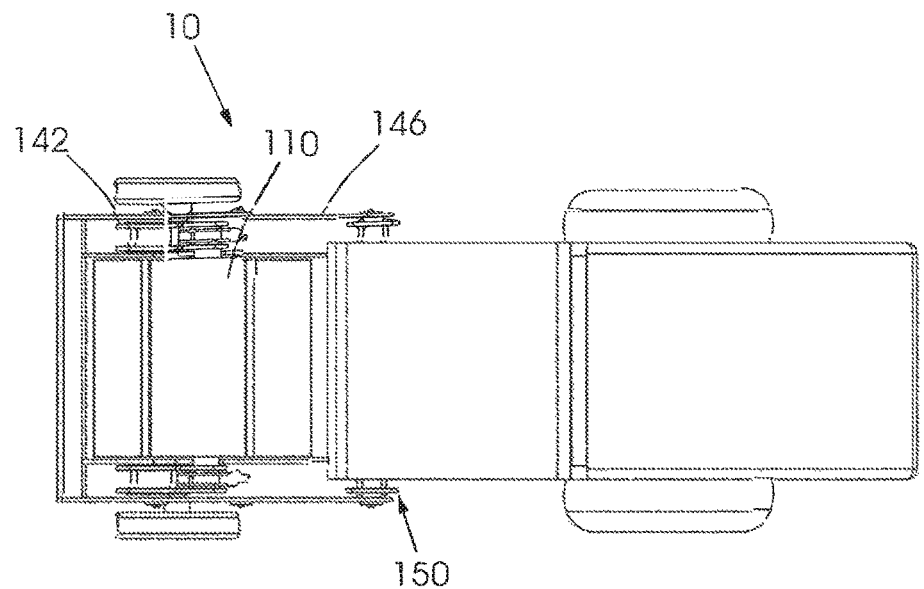
Figure 1C:
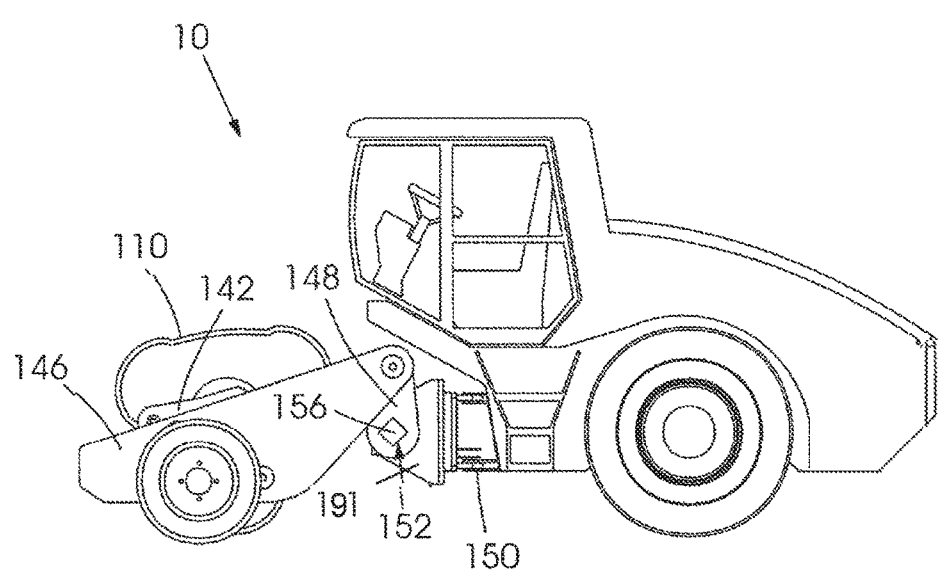
Figure 2A:
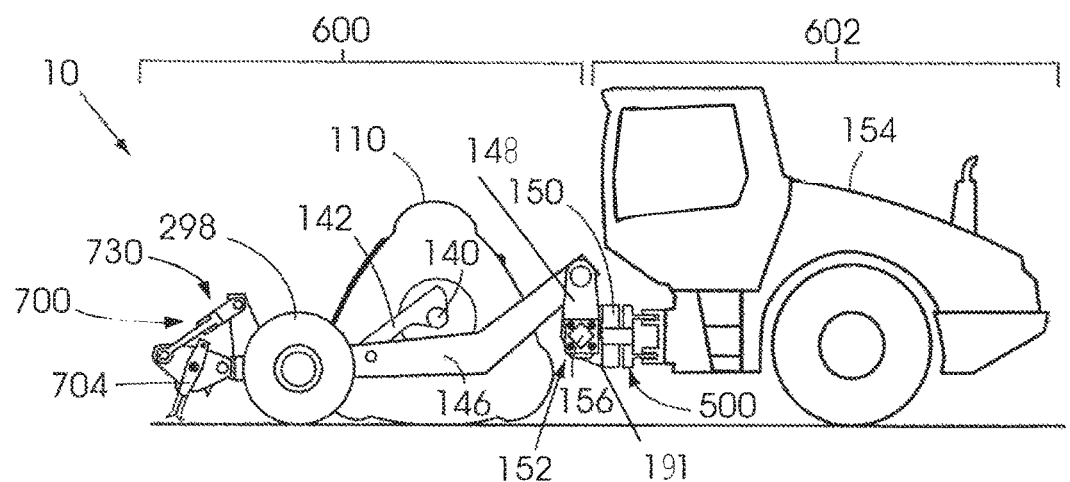
FIG. 2a shows a schematic side view of a bi-directional single drum, self-propelled impact compactor in accordance with the invention.
Figure 2B:
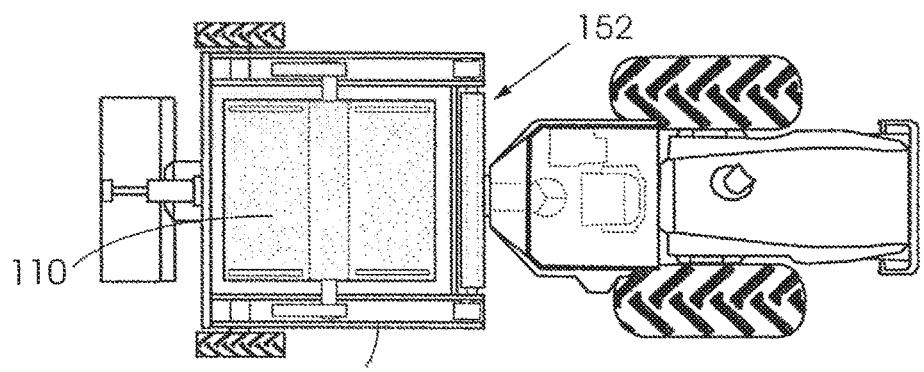
Figure 2C:
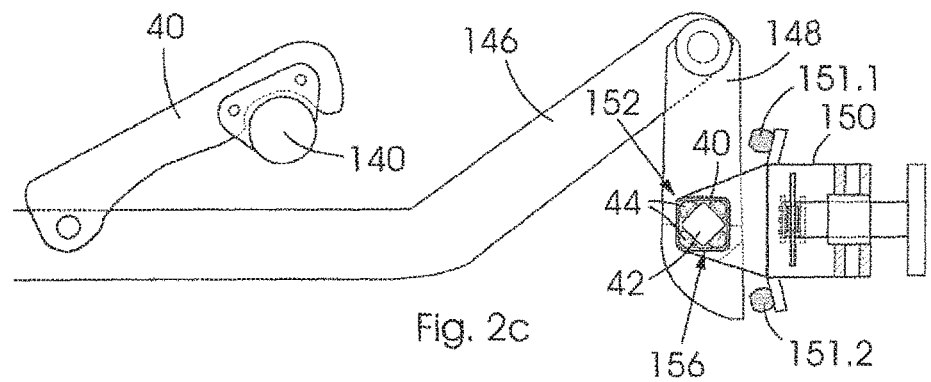
Figure 2D:
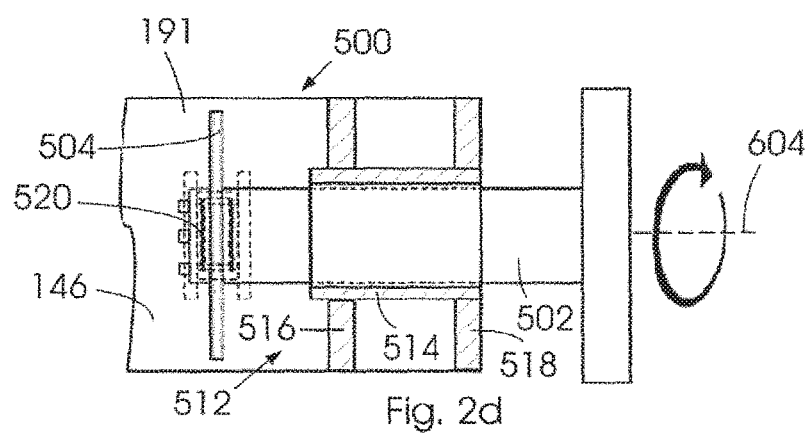
Figure 2E:
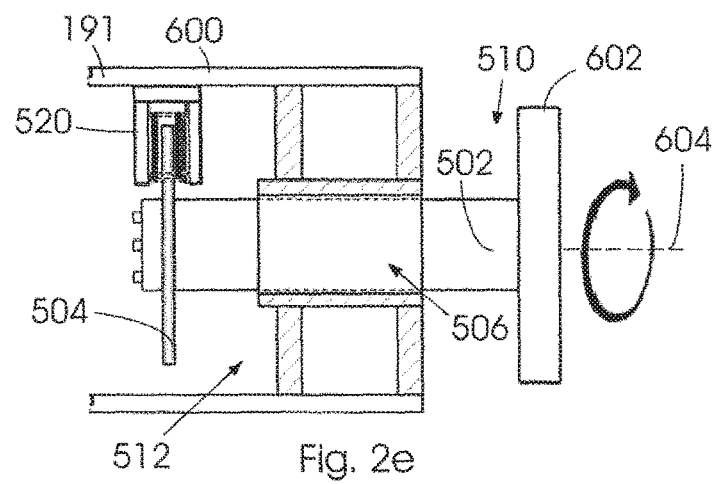
FIG. 2e shows a top view of a restriction/braking mechanism of FIG. 2d.
Figure 3A:
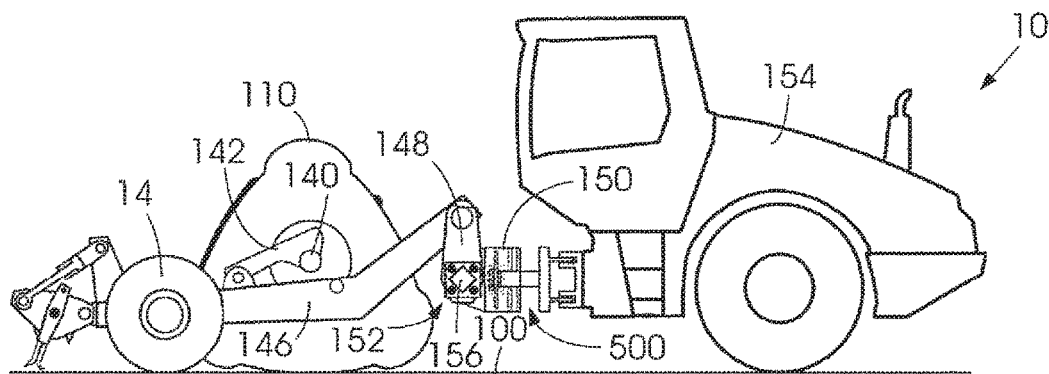
FIG. 3a shows a schematic side view of a bi-directional dual drum, self-propelled impact compactor in accordance with the invention, with one of the compactor drums removed.
Figure 3B:
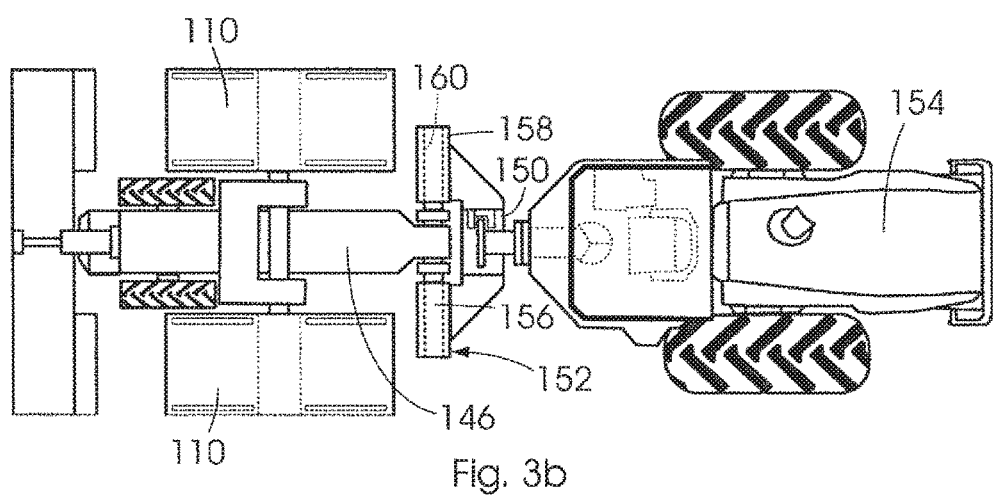

Reference is now specifically made to the three impact compactor 10 variations/examples shown in (a) FIGS. 1a-c, (b) FIGS. 2a&b, and (c) FIGS. 3a&c. In the three examples shown in these figures, the impact compactor 10 includes a bidirectional compactor drum 110 which is rotatably mounted via an axle assembly 140 to a link or pair of links 142 (hereinafter referred to as the "drag link(s) 142"). Alternatively, the axle assembly 140 may be fast mounted/fixed to the compactor drum 110 and the axle assembly 140 may be mounted to the drag link(s) 142 in such a manner that enables the axle assembly 140 to rotate relative to the link.

One end of each drag link 142 is connected to the axle assembly 140, while an opposite end thereof is pivotally mounted to a chassis structure 146. The chassis structure 146 is mounted to a coupling arrangement 150 for coupling it to a drive unit 154 via a damping arrangement 152. The damping arrangement 152 is in the form of a rubber torsion spring-type damping arrangement and includes a link 148 (hereinafter referred to as the "drop link 148") which is pivotally mounted to a front part of the chassis structure 146. More specifically, one end of the drop link 148 is connected to the chassis structure 146 while an opposite end is mounted to the coupling arrangement 150 via a rubber torsion spring 156. In one example, the one end of the drop link 148 may be connected to the chassis structure 146 via another rubber torsion spring-type damping arrangement.

The damping arrangement 152 (see FIGS. 2f, 2g and 5-7) includes an outer, elongate non-circular tubular member 40 which defines an elongate non-circular passage/channel 48 which extends along the length of the outer tubular member 40; an inner elongate non-circular shaft member 42 which is positioned in the channel 48 defined by the tubular member 40; and a plurality of wedge formations 44, where wedge formations 44 are wedged between the inner shaft member 42 and the outer tubular member 40. The outer tubular member 40 and the inner shaft member 42 are co-axially aligned with each other along an axis 202. The inner shaft member 42 is fixed, at both ends, to the drop link 148 (see FIG. 2a), while the outer tubular member 40 is fixed to a connection member/structure 191 of the coupling arrangement 150. More specifically, the drop link 148 includes a lower section 53 which is fixed to the inner shaft member 42 and an upper section 52, which is upwardly spaced from the central section 38, to which the chassis structure 146 is pivotally connected.

In the embodiment shown in FIGS. 2f, 2g and 5, the inner shaft member 42 is square, when seen in transverse cross-section. Similarly, the channel 48 defined by the outer tubular member 40 is also square, when seen in transverse cross-section. When seen in transverse cross-section, the square-shaped inner shaft member 42 is oriented or angularly displaced relative to the square-shaped channel 48 about their common axis at an angle of about 45°, with planar sides 54.1, 54.2, 54.3 and 54.4 of the inner shaft member 42 facing respective corners 56.1, 56.2, 56.3 and 56.4 of the channel 48. A wedge formation 44 is positioned in each corner 56.1, 56.2, 56.3 and 56.4 of the channel 48 and is wedged between the inner shaft member 42 and outer tubular member 40, thereby to locate the inner shaft member 42 centrally in the channel 48. In this position, the inner shaft member 42 and outer tubular member 40 do not contact each other, but are spaced from each other by the wedge formations 44.

The wedge formations 44 are elongate and extend along the length of the channel 48. The wedge formations 44 are made from a resiliently deformable material (e.g. rubber). As a result, when relative torque is applied between the inner shaft member 42 and the outer tubular member 40, about the axis 202, the wedge formations 44 will resist/oppose (but will not prevent) relative rotation between the inner shaft member 42 and the outer tubular member 40 about the axis 202. As the torque increases, the wedge formations 44 start to deform as a result of the forces acting thereon by the two members 40, 42, which allows the members 40, 42 to rotate relative to each other in a first direction. As the wedge formations 44 are deformed, they become wedged more securely between the two members 40, 42, which increases the resistance/opposition they provide against the relative rotation of the two members 40, 42. Due to the resilience of the wedge formations 44, when torque is decreased, the wedge formations 44 will function as a spring and urge the two members 40, 42 to rotate back towards a neutral position. This type of damping arrangement which includes an outer tubular member 40, a shaft member 42 and wedge formations 44, is hereinafter referred to as a "rubber torsion spring" 156.

In order to help limit the extent to which the drop link 148 can pivot relative to the coupling arrangement 150, two stop formations 151.1, 151.2 are provided on either side of the coupling arrangement 150, respectively. The drop link 148 is therefore able to pivot until it engages one of the stop formations 151.1, 151.2. The stop formations 151.1, 151.2 therefore effectively provide a maximum range of angular displacement of the drop link 148 relative to the coupling arrangement 150.

The manner of incorporation of the rubber torsion spring 156 into the damping arrangement 152 is generally dependent on the design of the linkages between the compactor drum/s 110 and the coupling arrangement 150 and whether the impact compactor 10 is a single drum or dual drum impact compactor.

Figure 4A:
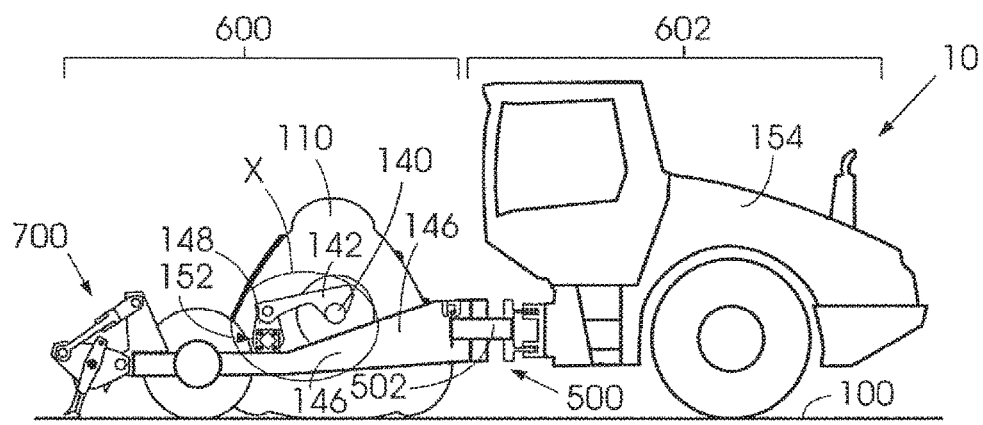
FIG. 4a shows a schematic side view of another bi-directional dual drum, self-propelled impact compactor in accordance with the invention, with one of the compactor drums removed.
Figure 4B:
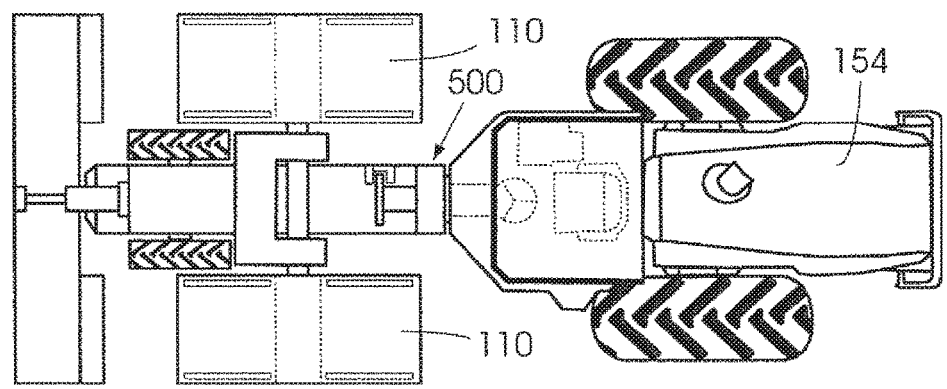

In the example shown in FIGS. 4a, 4b and 13, the drag link 142 is connected to the chassis structure 146 via the drop link 148. In this case, the rubber torsion spring 156 is connected between the drop link 148 and the chassis structure 146, such that the drop link 148 is pivotable relative to the chassis structure 146 within a certain degree as limited by the rubber torsion spring 156. In order to help limit the extent to which the drop link 148 can pivot relative to the chassis structure 146, two stop formations 164, 166 are provided on either side of the drop link 148, respectively. The drop link 148 is therefore able to pivot until it engages one of the stop formations 164, 166. The stop formations 164, 166 therefore effectively provide a maximum range of angular displacement of the drop link 148 relative to the chassis structure 146.

The wedge formations 44 may typically be made of rubber with properties that will provide enough resistance to help keep the drop link 148 within a certain range of angular displacement which is less than the maximum range offered by the stop formations 164, 166 during a large part of the compaction operation. This will help ensure that the drop link 148 stays between the stop formations 164, 166 during operation in order to reduce jerk loads between the chassis structure 146 and the drive unit 154, thereby producing a smoother ride and prolonging the life of the impact compactor 10.

From the above, it should be clear that a rubber torsion spring may be used to connect the chassis structure 146 to the drop link 148, and/or to connect the drop link 148 to the coupling arrangement 150. A rubber torsion spring type may therefore typically be installed at one or more of the pivotal connections which link the chassis structure 146 with the compactor drums 110 and the coupling arrangement 150, respectively.

It will be clear that this type of damping arrangement 152 will be effective when the compactor drum 110 is being rolled in both a forward and reverse direction.

In order to further support the damping function, a shock absorber may be mounted between one or more of the pivotal connections which link the chassis structure 146 with the compactor drums 110 and the coupling arrangement 150, respectively. In other words, a shock absorber may be mounted (a) between the drag link 142 and the chassis structure 146, (b) the chassis structure 146 and the drop link 148 and/or (c) the drop link 148 and the coupling arrangement 150. The damping cylinder and bladder type accumulator currently used for uni-directional impact compactors will not work for bi-directional impact compactors. The Inventor believes that a major advantage of the damping arrangement 152 is the fact that it can provide a damping function when the impact compactor travels in both a forward and rearward direction. The design is also relatively simple and inexpensive, when compared to the prior art damping arrangement described earlier in the specification. Since there is no longer a need for a damping cylinder and bladder type accumulator (which takes up space), it allows for more space and flexibility for positioning other components of the impact compactor 10.

Figure 20:
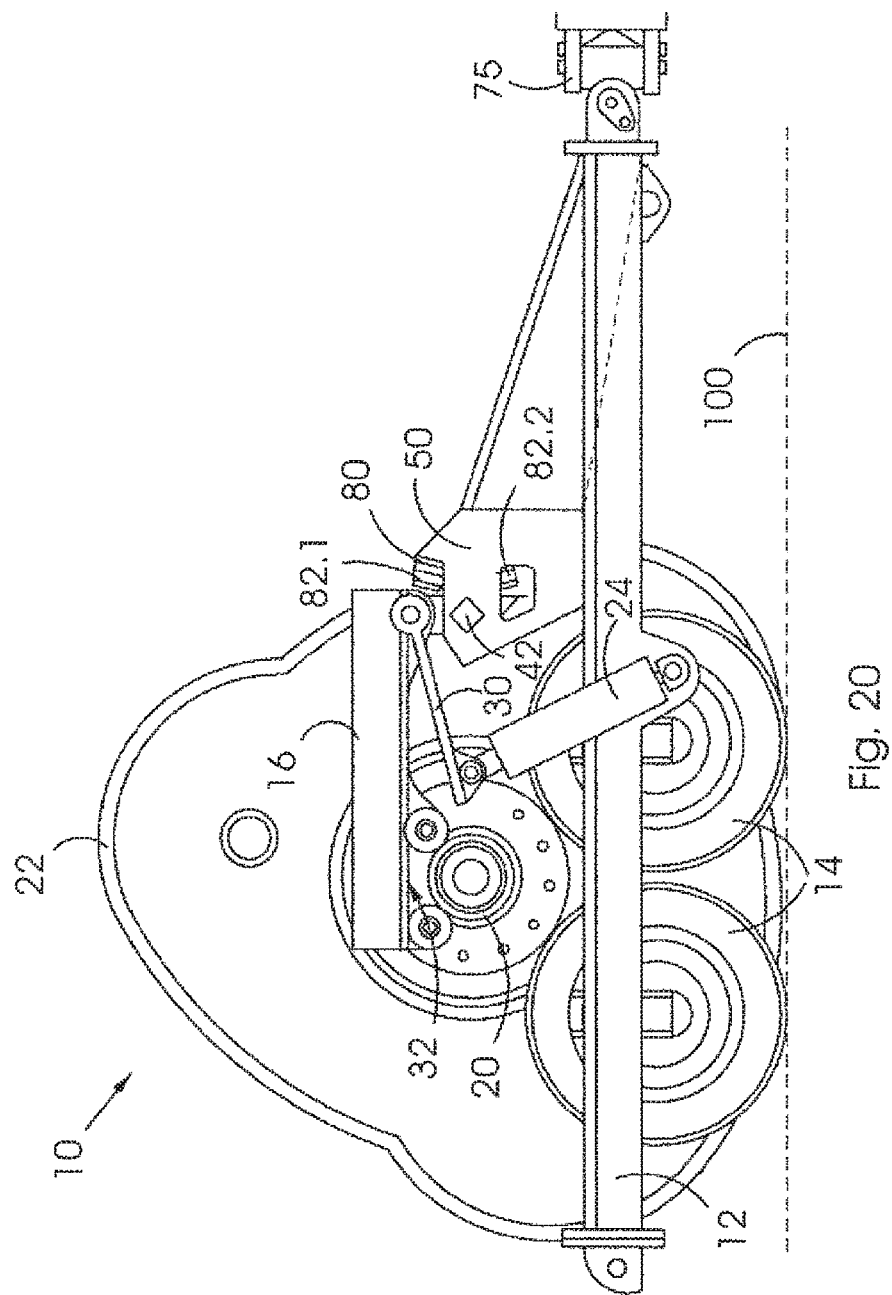
FIG. 20 shows a schematic side view of part of an impact compactor in accordance with the invention, where a lifting cylinder of a lifting arrangement of the impact compactor is in a retracted condition and an impact compactor roller of the impact compactor is in a lowered position as it would be when compacting.
Figure 21:
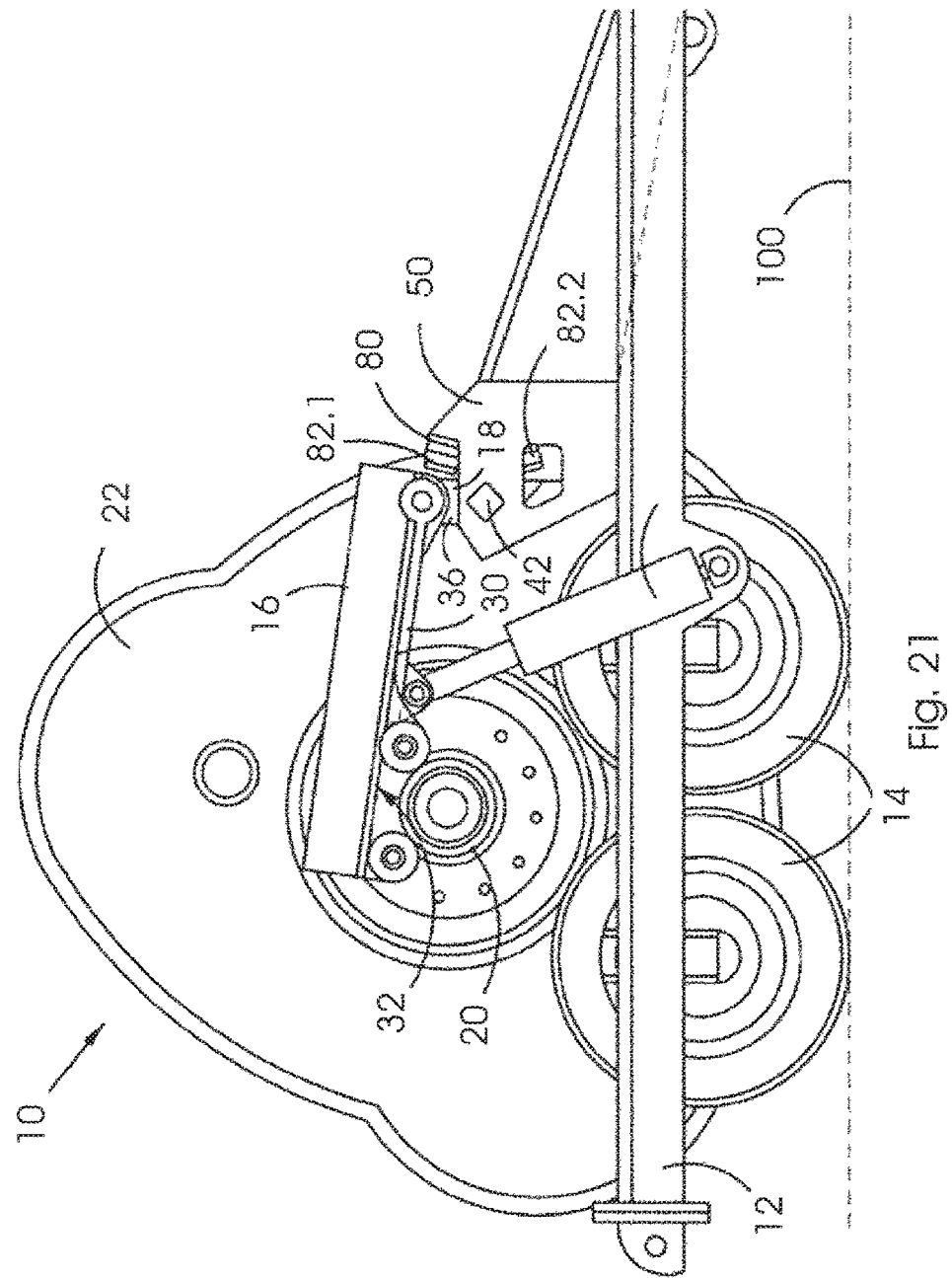
FIG. 21 shows a schematic side view of the impact compactor of FIG. 20, where the lifting cylinder is in a fully extended condition and the compactor roller is in a raised position as it would be when moving the impact compactor.
Figure 22:
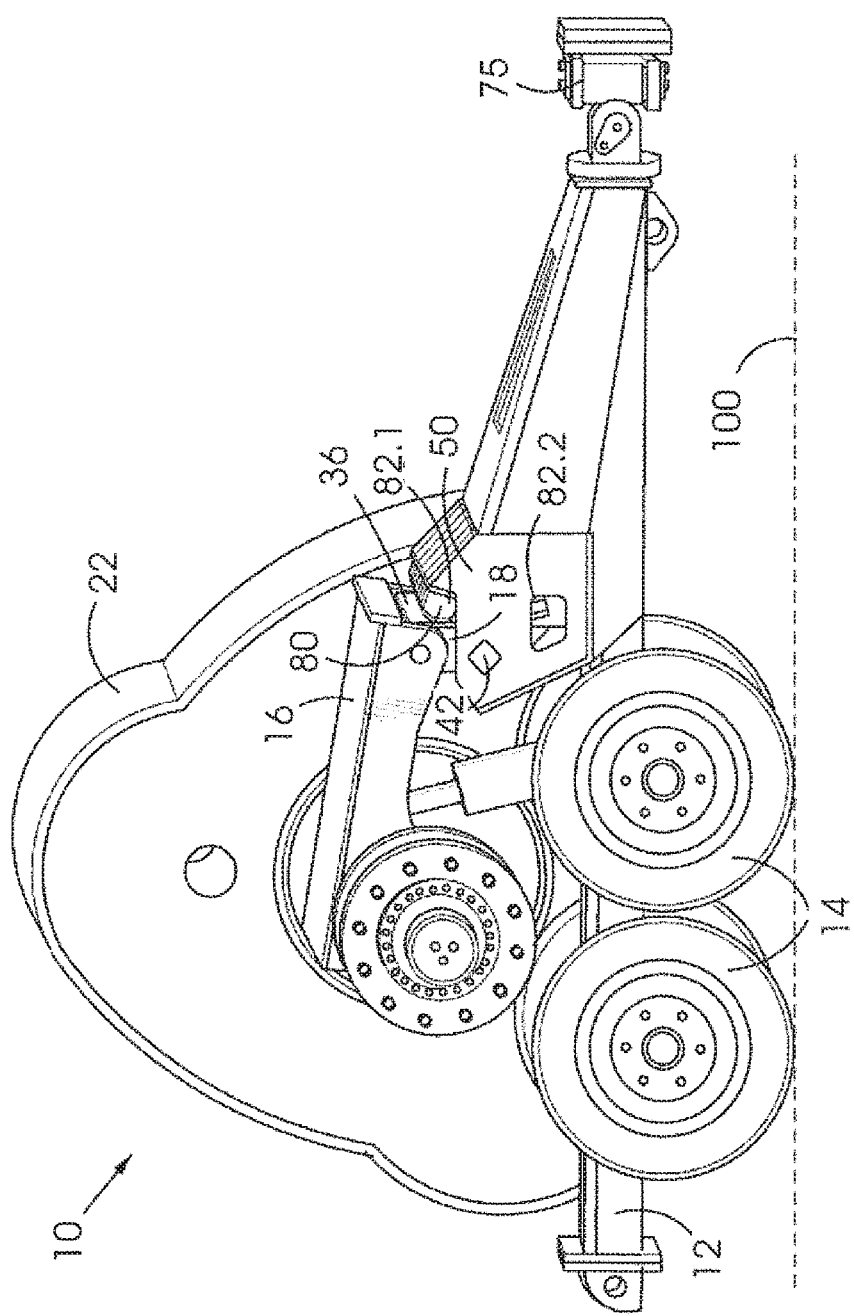
FIG. 22 shows a three-dimensional view of the impact compactor of FIG. 20.

In another example (shown in FIGS. 20-22), the impact compactor 10 may include a chassis structure 12; two pairs of wheels 14 (of which only some may be illustrated in the Figures for illustrative purposes) on which the chassis structure 12 is supportively mounted; a drag link 16 which is pivotally mounted to the chassis structure 12 by means of a damping arrangement 152; and a compactor drum mounting arrangement 20, including an axle assembly, on which a pair of non-round compactor drums 22 (of which only one is illustrated in the FIGS. 20-22 for illustrative purposes) is rotatably mounted. In this example, the damping arrangement 18 is similar to the damping arrangement 152 described above).

Figure 23:
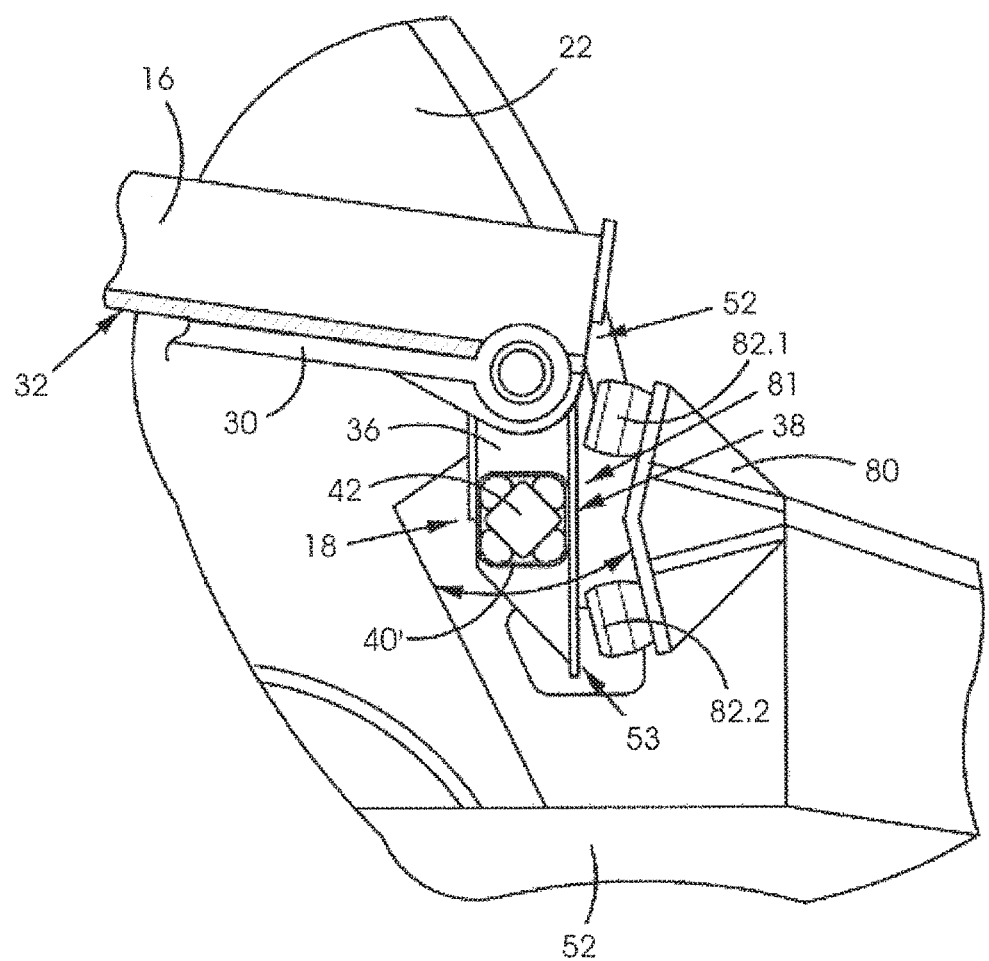
FIG. 23 shows a schematic side view of the impact compactor of FIG. 20, where a side plate of a chassis structure of the impact compactor is removed.

A lifting plate 30 is positioned generally below the drag link 16 and is pivotally mounted to the drag link 16. A lifting cylinder 24 is positioned below the lifting plate 30 and is, at an operatively lower end, mounted to the chassis structure 12 and, at an opposite operatively upper end, mounted to the lifting plate 30 in order to displace the lifting plate 30 relative to the drag link 16. The lifting cylinder 24 is configured to urge the lifting plate 30 against an underside 32 of the draglink 16 thereby to pivot the drag link 16 upwardly, which in turn causes the compactor rollers 22 to be lifted off the ground surface 100 in order to facilitate displacement of the impact compactor 10, when not in use (see FIGS. 21-23). The lifting cylinder 24 is therefore configured to displace the impact rollers 22, relative to the chassis structure 12, between a lowered position (see FIG. 1) where the rollers 22 contact/engage the ground surface 100 and a raised position (see FIG. 2) where the rollers 22 are raised above/spaced from the ground surface 100.

The impact compactor 10 includes a bump stop or limiting arrangement 80 (see FIG. 23) which is configured to limit the extent by which the drop link 36 can pivot relative to the chassis structure 12 (i.e. it limits the extent of rotation between the inner shaft member 42 and the outer tubular member 40). The limiting arrangement 80 includes two stop formations 82.1, 82.2 which are located on a side 81 of the drop link 36, wherein the one stop formation 82.1 is located proximate the upper section 52 of the drop link 36 and the other stop formation 82.2 is located proximate a lower section 53 thereof. The stop formation 82.1 is configured to limit the amount of forward pivot of the drop link 36, relative to the chassis structure 12, by engaging with the side 81 of the drop link 36 when the drop link 36 has reached an upper pivot limit. Similarly, the stop formation 82.2 is configured to limit the amount of backward/rearward pivot of the drop link 36, relative to the chassis structure 12, by engaging with the side 81 of the drop link 36 when the drop link 36 has reached a lower pivot limit.

In another example the lifting arrangement/cylinder mechanism disclosed in PCT Publication No 2005/014958, which is herein incorporated by reference, could also be used with the present invention.

Figure 8:
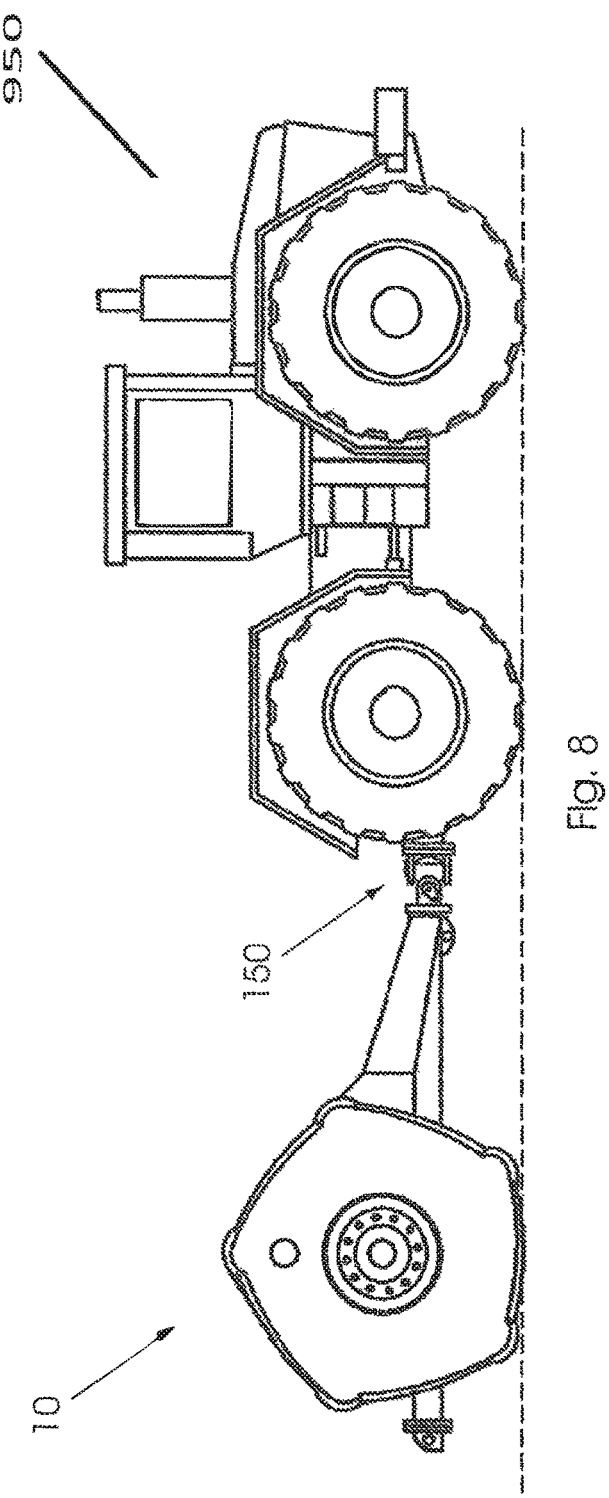
FIG. 8 shows a side view of a towed impact compactor in accordance with the invention.
Figure 9:
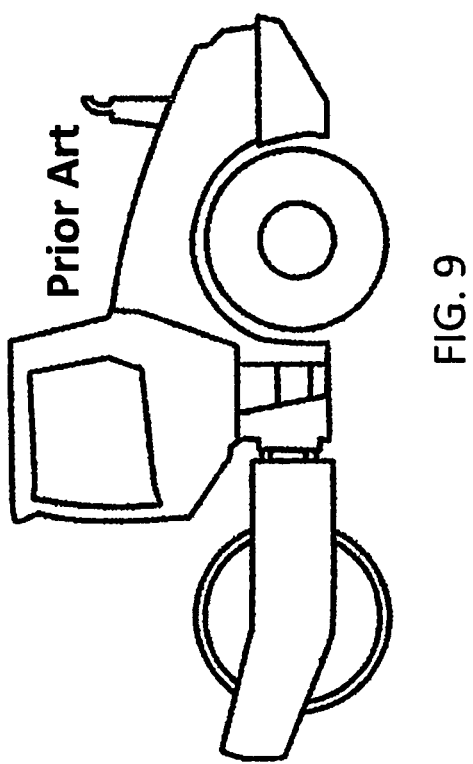
FIG. 9 shows a side view of a conventional vibro roller.

In the embodiment illustrated in FIGS. 1a to 4b, the impact compactor 10 includes a coupling arrangement 150 which is configured to couple the compactor half section to the tow half section. The impact compactor 10 may however also be towed by a separate vehicle (e.g. a tractor 950) as illustrated in FIG. 8 by incorporating a similar coupling arrangement 150.

Referring to FIGS. 1a-3b, when the self-propelled impact compactor 10 is used for compaction, the compactor drums 110 roll and compact the ground/soil surface 100 as the impact compactor 10 is pulled along the ground surface 100 by a tow half section 154. Since the compactor drums 110 are not round, they cause tension and compression forces by pushing and pulling on the drop link 148 as the compactor drums 110 rotate. Since the drop link 148 is connected to the inner tubular member 42 and the outer shaft member 40 is fixed to the coupling arrangement 150, the transmission of the pushing and pulling to the drive unit and the coupling arrangement 150 is reduced/countered by the damping arrangement 152. In a self-propelled configuration, the main purpose of the damping arrangement 152 is to reduce tension and compression forces between a compactor half section 600 and a tow half section 602 of the impact compactor 10 (see FIG. 4a). For a towed impact compactor the purpose of the damping arrangement 152 is to reduce tension and compression forces between the chassis structure 146 of the impact compactor 10 and a tow vehicle 950.

FIGS. 6 and 7 illustrate a different embodiment of the damping arrangement 152 shown in FIGS. 2c, 2f, 2g and 5. In this embodiment, the channel 48 of the outer tubular member 40 is generally hexagonal-shaped, when seen in transverse cross-section. The inner shaft 42 is tubular and is shaped in the form of a three leaf clover having three equiangularly spaced lobes, when seen in transverse cross-section. A wedge formation 44 is provided in every second corner of the channel 48 of the outer tubular member 40 between adjacent lobes.

In order to make the impact compactor more versatile, the impact compactor can be self-propelled. A self-propelled bi-directional impact compactor provides certain advantages, such as a tighter turning radius, a more compact design which is capable of travelling in both the forward and reverse directions of travel and of all-round better manoeuvrability. The impact compactor of this invention could either be a single drum or dual drum self-propelled impact compactor.

It will be appreciated that although some of the figures (e.g. FIGS. 1a-4b) do not specifically illustrate a lifting arrangement, such as the lifting cylinder 24 (see FIG. 21), it will be appreciated that the different impact compactor variations described in the specification will typically include some type of lifting arrangement which is configured to lift the impact compactor drums 110 from a lowered operative position to a raised inoperative position during which the weight of the compactor drums 110 are supported by the wheels 14. When an impact compactor 10 is therefore not in use and needs to be moved, the lifting arrangement will lift the compactor drums 110 towards its in operative, raised position. The impact compactor 10 may be configured to allow the chassis structure 146 and compactor drums 110 to yaw and roll relative to the power section/drive unit 154. The compactor may also include a mechanism which the operator can use to control the yaw motion of the self-propelled impact compactor in order to allow an operator to steer the impact compactor.

Figure 11A:
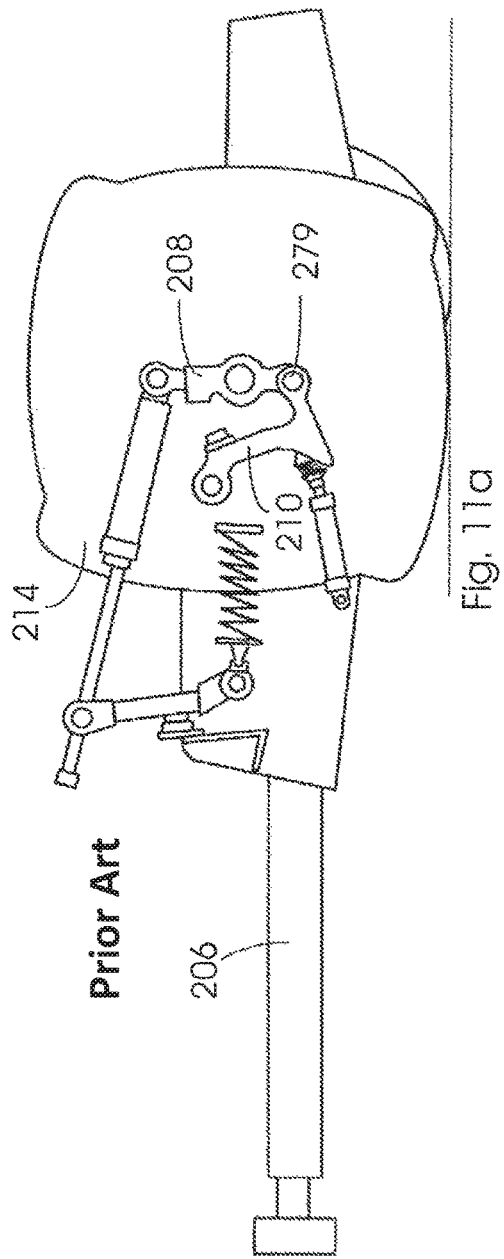
FIG. 11a shows a schematic side view of part of a conventional towed single drum impact compactor with an existing damping arrangement.
Figure 11B:
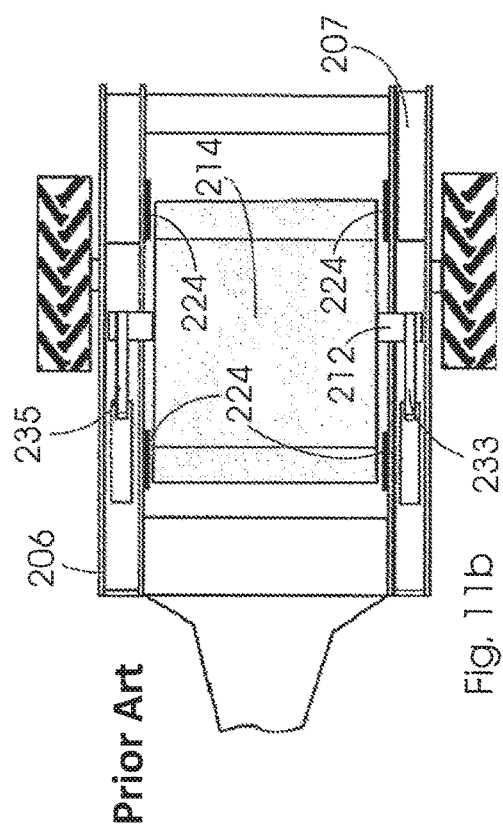
FIG. 11b shows a schematic top view of a conventional towed single drum impact compactor.

In conventional single drum towed impact compactors (see FIG. 11a&b), the rise and fall of the compactor drum 214 is accommodated by the two drag links 233, 235 and the push and pull forces resulting from the rising and falling of the drum by a drop link 208, with these two links being linked together at a pivot point 279. The chassis structure 206 typically forms a rectangular frame 207 around the compactor drum 214 (see FIG. 11b). However, this double linkage system (i.e. the drag link 210 and drop link 208 which forms the linking system between the chassis structure 206 and the axle assembly 212) is not able to hold the compactor drum 214 rigidly within the surrounding frame 207 formed by the chassis structure 206, which causes the compactor drum 214 to make contact with the inner side of the frame, especially when the impact compactor 200 is turning. Wear plates 224 are typically fixed to an inner side of the frame, in order to try and protect it.

In the preferred embodiments of the present invention illustrated in FIGS. 1a-4b, this problem is overcome by separating the drag link 142 (which accommodates the rise and fall movement of the compact drum 110) from the drop link 148 (which accommodates the fore and aft movement of the compactor drum 110). In this embodiment, the drag link 142 and the drop link 148 are each independently, pivotally connected to the chassis structure 146. This specific configuration was described in more detail earlier in the specification.

The single drum impact compactor 10 may include two drag links 142, both of which are connected between the chassis structure 146 and the axle assembly 140 in a similar manner as the drag link 142 shown in FIGS. 1a and 1b.

It will be appreciated that the rubber torsion spring and the splitting of the drag link and drop link may also easily be implemented in a dual drum configuration, such as a self-propelled impact compactor.

Figure 14A:
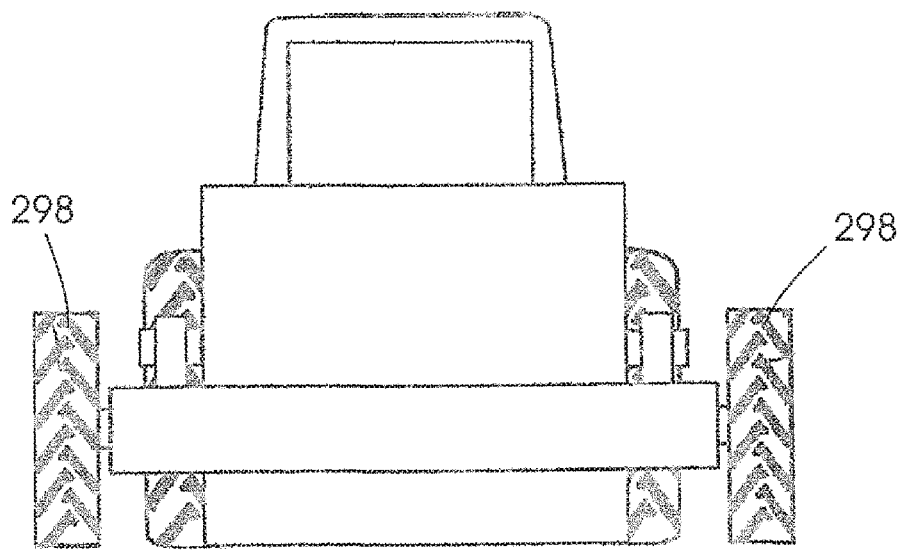
FIG. 14a shows a rear view of a single drum impact compactor in accordance with the invention.
Figure 14B:
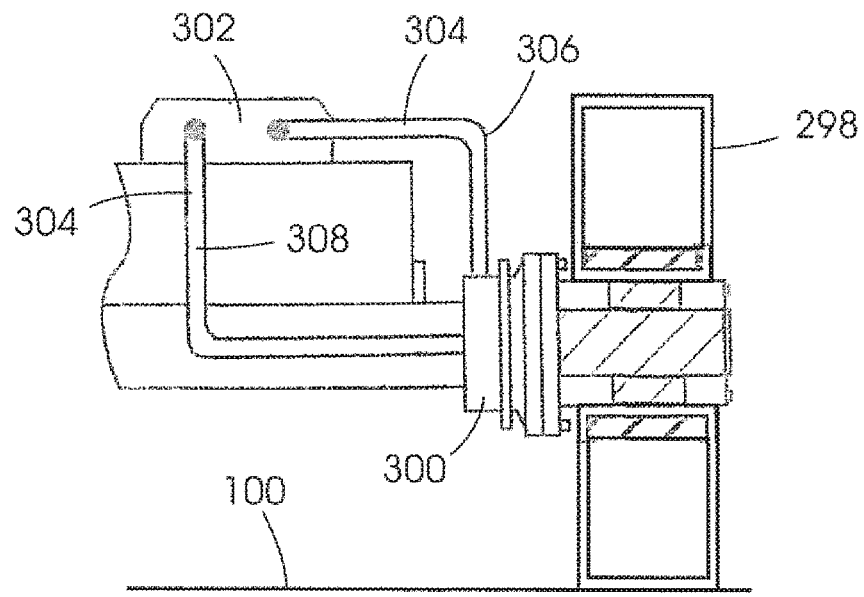
FIG. 14b shows a schematic, partially cross-sectional, rear view of a drive arrangement of an impact compactor in accordance with the invention.

Reference is now specifically made to FIGS. 14a&b. The Inventor has found that a self-propelled impact compactor which has only two driven wheels at the front half section, does not always have sufficient traction in order to work in certain conditions or on certain soil types. Due to the lack of traction, the impact compactor may not be able to travel fast enough. If the impact compactor is travelling slower than the required travel speed, the compactor drum will rotate too slowly over its salient point to allow the compactor drum to tip over in a manner that allows it to fall freely forwardly and downwardly to the ground surface, in order to produce the required impact blow. The compactor drum fall speed will typically be hindered due to the lack of horizontal velocity, thereby resulting in a significantly reduced impact blow. In order to address this problem, the support wheels 298 on the trailing side of the self-propelled impact compactor (or at least one of the support wheels) can be driven by hydraulic motor/s 300. More specifically, the motors 300 may be hydrostatic motors. The motors 300 will typically utilise a hydraulic pump 302 in order to pump fluid to and from the motors 300 via a set of pipes 304.

The hydrostatically driven wheels 298 will thus help allow the self-propelled impact compactors to operate effectively on different types and conditions of soils on construction sites. As opposed to a vibratory roller which can deliver maximum compaction capability over a range of speeds including very slow speeds, because the impact compactor requires a relatively high optimum speed in order to deliver a high energy impact blow, good traction of the impact compactor is critical to the impact compactor being able to compact the ground effectively. It will however be appreciated that the use of driven wheels may also be implemented with towed impact compactors and can be used whether the impact compactor uses a single compactor drum or dual compactor drums.

The pressurized hydraulic fluid could flow from the hydraulic pump driving the tow half section of the impact compactor or a separate hydraulic pump can be mounted on the tow half section/drive end from where it will send pressurised hydraulic fluid via an inlet pipe 306 to the motor 300. The motor 300 will then drive the wheel 298 on the ground surface 100. The hydraulic fluid is discharged from the motor 300 via the pipe 308 back to the pump 302. The operator will typically have the ability to control the speed and direction of the motor 300 by operating a mechanism that controls the pressure or flow of the hydraulic fluid. The speed and direction of the motor 300 may alternatively be controlled automatically by a drive system which uses the speed and direction of the driven wheels of the tow half section/driving end in order to determine the speed and direction of the driven wheels 298.

Figure 19:
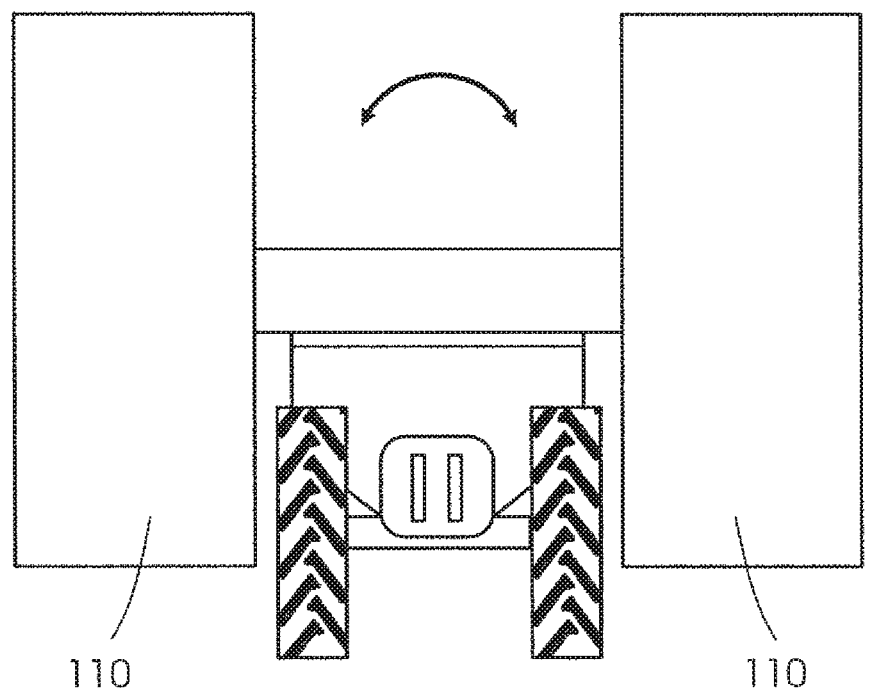
FIG. 19 shows a schematic end view of a duel drum impact compactor, where the impact drums are in a raised position in order to transport the impact compactor.

One disadvantage of a dual drum impact compactor, whether it be self-propelled or towed, is that when the compactor drums are lifted off the ground and the impact compactor is travelling in an inoperative, transport configuration (such as when the impact compactor is being moved from one site to another), the weight of the spaced apart compactor drums cause the impact compactor to be unstable (see FIG. 19). This instability may cause the compactor to roll excessively relative to the tractor, causing the compactor drums to fall sideways and strike the ground surface, resulting in damage to the compactor and the road surface, as well as possibly the tractor.

In order to address this problem, a braking/restriction arrangement 500 for a dual drum impact compactor (see FIGS. 2d and 2e) is implemented.

The braking arrangement 500 typically forms part of the coupling arrangement 150 and is configured such that, when activated, it prevents a roll motion of the compaction half section/drum section 600 relative to the tow half section/power section 602 (see also FIG. 3a). The term "roll" in this instance refers to the rotation of the drum section 600 relative to the power section 602 about an axis 604 which extends along the length of the impact compactor 10 and along a travel direction thereof, when the impact compactor 10 travels in a straight line.

The braking arrangement 500 includes a first part 510 which is fixed to a rear part of the power section 602 and a second part 512 which is fixed to the connection member 191 of the coupling arrangement 150. The first part 510 includes a shaft member 502 which extends rearwardly therefrom. A circular disc 504 is fixed to a free end of the shaft member 502. The second part 512 defines a socket/hollow tube 506 for receiving the shaft 502 and disk 504. A bearing 514 is fitted around the shaft 502 and is secured to the connection member 191 via two securing members 516, 518. The bearing 514 therefore allows the shaft to rotate relative to the connection member 191 about the axis 604. In other words, the bearing 514 allows the drum section 600 to roll relative to the power section 602.

The second part 512 includes a brake calliper 520 which is fixed to the connection member 191 and fitted around part of the disc 504. The brake calliper 520 typically includes two brake pads and is configured to apply a friction/braking force on the disc 504 in order to limit/district relative rotation between the drum section 600 and the power section 602. The brake calliper 520 and disc 504 may therefore together be seen as a type of disc brake. The braking arrangement 500 may optionally include two or more brake callipers 520 for better braking.

The braking arrangement 500 serves the purpose of providing stability to the drum section 600 when the compactor drums 110 are raised above the ground surface 100 for transportation purposes. The braking arrangement 500 may be manually or automatically activated when the drums are raised off the ground surface 100. The brake calliper 520 may therefore be operatively connected to the power section 602 such that an operator of the impact compactor 10 can operate it.

In another example, the braking arrangement 500 could utilize a drum brake to brake the second part 512.

When an impact compactor is towed over a soil surface, it produces a series of spaced apart indentations caused by the compactor drum blows on the soil surface. In order to help level the ground, some conventional impact compactors include a blading arrangement which is mounted to the chassis structure and which travels behind the drum/s of the impact compactor during operation. Since conventional impact compactors only travel in the forward direction, this blading arrangement is designed to operate only in the forward direction.

A leveller arrangement 700 (see FIGS. 2a and 15) in accordance with the invention is however able to work in both the forward and reverse direction. The leveller arrangement 700 includes a generally elongate support/mounting member 702 which is, at one end, pivotally mounted to the chassis structure 146. An elongate levelling member 704 is pivotally connected to a central part of the mounting member 702 such that it extends generally downwardly therefrom towards the ground surface 100. More specifically, a central part of the levelling member 704 is pivotally connected to the mounting member 702 such that the levelling member 704 is able to swing with a general pendulum motion fore and aft to an angle limited by two stop formations 750, 752 which are located on either side of the levelling member 704, respectively, and which are mounted on the mounting member 702. A torsion spring 706 is connected between the mounting member 702 and the levelling member 704 at their pivotal connection.

A lower, free end of the levelling member 704 includes two ground engaging formations 708, 710, wherein each formation 708, 710 includes a cutting edge/blade 712, 714. The blades 712, 714 face in generally opposite directions such that the one blade 714 can level the ground surface 100 when travelling in the forward direction, while the other blade 712 can level the ground 100 when travelling in a rearward direction. The blades 712, 714 are typically made of an abrasive resistant material which allows the blades 712, 714 to cut into the soil. The torsion spring 706 is typically configured such that it urges the levelling member 704 into the ground surface during compaction.

Figure 15:
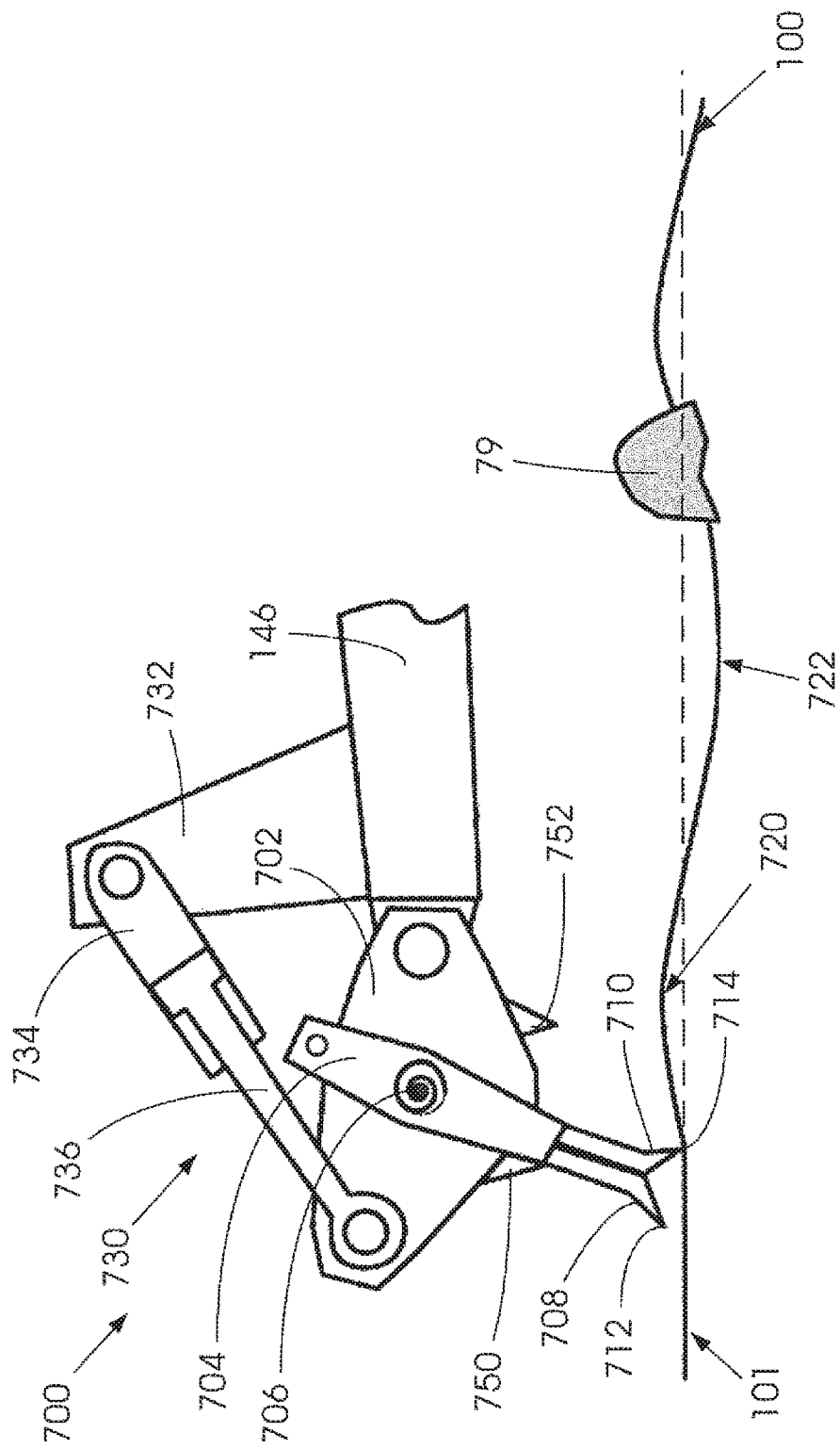
FIG. 15 shows a schematic side view of a levelling arrangement in accordance with the invention.

More specifically, the torsion spring 706 may typically have a neutral, unbiased position when the levelling member 704 is in a vertical position when the impact compactor 10 however travels in a forward direction, the connection between the cutting blade 714 and the ground surface 100 will force the levelling member 704 to pivot slightly rearwardly towards a position as shown in FIG. 15. When in this position, the torsion spring 706 will effectively urge the levelling member 704 back towards its neutral position, thereby resulting in urging the cutting blade 704 into the ground surface 100. As the impact compactor 1 travels forwardly along the surface 100, the cutting blade 714 will help to level the surface. The exact angle of the levelling member 704 (e.g. relative to a neutral, upright/vertical position) may typically depend on the actual design dimensions and soil conditions on which the blades 712, 714 would have to work.

In a similar manner, when travelling in a rearward direction, the levelling member 704 will be forced towards an angle in which it extends generally forwardly and downwardly. In this position, the torsion spring 706 will urge the levelling member 704 back towards its neutral position, thereby resulting in urging the cutting blade 712 into the ground surface 100. The cutting blade 712 will therefore help to level the surface 100 as the compactor 10 travels along the surface 100 in a rearward/reverse direction.

Alternatively, the levelling member 704 may include only one cutting blade which faces one direction. When the compactor then travels in the opposite direction, the cutting blade is lifted off the ground surface 100 and rotated through 180 degrees, either manually or automatically.

The levelling member 704 can be raised off the ground surface 100, either manually or automatically, when levelling is not required. It is also possible to detach the leveller arrangement 700 entirely from the impact compactor chassis 146 for situations that do not require such an arrangement 700. The leveller arrangement 700 is typically configured to move soil 720 displaced by the action of the compactor drum 110, into the indentations 722 which the compactor drum 110 produce, thereby providing a smoother surface 101 for the impact compactor 10 to travel over for the next pass over the same section of soil.

The leveller arrangement 700 can be configured to operate effectively on a range of soil materials and conditions by having an adjustment system/arrangement 730 in place that can adjust the depth to which the levelling member 704 penetrates into the soil, the angle of the leveller arrangement 700 relative to the ground and the force that is exerted on the blades 712, 714 to penetrate into the soil and displace the soil. The adjustment system/arrangement 730 can also include a safety mechanism 730 that will allow the levelling member 704 or mounting member 702 to release when striking rocks and other solid objects 79, which could otherwise damage the leveller arrangement 700. The safety mechanism can enable the leveller arrangement 700 to pass over such objects in a smooth and efficient manner without damage to the leveller arrangement 700. Once the obstruction 79 is passed, the levelling member 704 or mounting member 702 can automatically return to the correct position.

In the example shown in FIG. 15, the adjustment system/arrangement 730 includes a support structure 732 which is secured to the chassis structure 146 and a hydraulic cylinder 734 which is connected between the support structure 732 and the mounting member 702. More specifically, one end of the cylinder 734 is pivotally connected to the support structure 732, while an opposite end of the cylinder 734 is pivotally connected to a free end of the mounting member 702. If a piston arm 736 of the cylinder 74 is extended, the levelling member 704 is lowered to the ground surface 100, and if the piston arm 736 is retracted, the levelling member 704 is lifted off the ground surface 100.

When the direction of travel of the machine is reversed the blade 712 which is held in contact with the soil surface 100 by the spring 706, digs into the soil sufficiently to induce the levelling member 702 to pivot about its pivot axis (i.e. in a counter-clockwise direction when seen in side view as shown in FIG. 15). In doing so, the spring 706 is tensioned.

The magnitude of the force induced onto the soil surface 100 by the spring 706 can be managed/controlled by the cylinder 734.

With certain surface conditions, even a standard impact compactor may find it difficult to provide sufficient compaction. Examples of such surfaces are a very dense layer of gravel such as an existing, traffic compacted unpaved road; a surface of self-cementing gravel such as calcrete (calcium carbonate); laterite (iron oxide nodules); a layer of asphalt or a cement-treated base course. It will be appreciated that these surface conditions are mere examples and do not constitute an exhaustive list.

Standard impact compactor drums typically strike the soil surface with a relatively large surface contact area, which is generally required for providing compaction at depth. The problem with achieving compaction on the type of surfaces mentioned above is that they consist of a hard surface crust which prevents the impact blow from having the required effect at a depth below the crust. This surface crust needs to be broken and separated from the rest of the surface before the impact compactor can be effective at treating the soil below the crust.

In order to address this problem, interchangeable and removable penetration plates 804-808 can be mounted to an impact drum 110 (see FIGS. 16-17b) in order to significantly reduce the surface contact area of the compacting face of the drum 10 so as to concentrate the load over smaller areas and deliver an impact blow of high pressure on these areas that is able to break up the surface layer and/or induce cracks in the surface layer 850 at targeted locations. Each penetration plate 804-808 typically includes at least one penetration formation mounted to a radially outer surface 810 (i.e. a peripheral surface) of the compactor drum 110. More specifically, the penetration plates 804-808 are mounted on the compaction portion 118 of the compactor drum 110 (also see FIG. 12b).

A variety of penetration plates 804-808 that have different sizes and geometries can be mounted to the compaction drums 110 in a variety of configurations (some examples are shown FIG. 16). In variation K, two elongate, parallel penetration plates 804, 805 extend transversely across the surface 810. In variation L, an elongate penetration plate 806 extends centrally along the surface 110. In variation M, two elongate, parallel penetration plates 807, 808 are located on, and extend along respective sides/edges of the compaction portion 118.

The penetration plates 804-808 can be removed relatively easily and quickly which helps to ensure that an impact compactor requires very little down time during operation, if a variety of penetration plate configurations are needed in order to achieve the required compaction. The interchangeable and removable penetration plates 804-808 therefore make the impact compactor 10 more effective for compacting a variety of different soil surfaces.

The penetration plates 804-808 are typically mounted by means of bolts (not specifically shown in the Figures), or other similar type of securing formation, which is able to resist the shock loads which it would be subjected to during compaction and which can be removed, if needed.

In the example illustrated in FIG. 17a, repetitive compaction runs over the same area with the penetration formations 807, 808 causes cracks to form, accumulate and eventually join and extend all the way down a surface layer 103. This causes a portion 107 of the surface layer 103, under the impact compactor drum 110, to separate from the rest of the surface layer 103. Once the surface is broken up or penetrated, the impact compactor 10 is typically able to compact the soil surface 105 more effectively, without the need of the actual penetration plates 804-808.

The penetration plates 807, 808 are typically intended for demarcating and cutting a lane which is the same width as the impact drum 110.

FIG. 17a shows the drum 10 with penetration plates 807, 808 leaving two spaced apart series of crack lines made by the impact of the penetration plates 807, 808 along the travel direction (longitudinal direction). It will be noted that in penetration formations 807, 808 define a lane. A completed lane already treated with a double run (coverage or pass) of the impact compactor drum 110 is indicated by crack lines 109. The actual impact blows become closely spaced in the longitudinal direction by repeated passes so that the crack lines grow to join together in a continuous line of cracks. Of importance to the effectiveness of the process of cracking a lane with the least number of compaction passes is that each successive impact blow must be accurately placed along a selected line of cracking. Once the cracks are continuous or nearly continuous, the selected lane becomes separated from the adjacent surface 111, enabling a small number of impact blows from the drum 110 without penetration plates 804-808 to cause transverse cracking of the selected lane and its settlement into the compacted subgrade soil.

It will be appreciated that the interchangeable and removable penetration plates 804-808 allows a selection and combination of penetration plates 804-808 which would be appropriate to achieve the required compaction. On large areas of work it may be best to crack the lanes first with penetration plates 807, 808 as shown in FIG. 17a and then remove the plates 807, 808 or use penetration plates 804, 805 to crack the lane transversely and deform it downwards, thereby compacting the underlying soil as shown in FIG. 17b. FIG. 17a shows lane 900 completely cracked, its width 902 being the same as the width of the compactor drum 110. FIG. 17b illustrates a compactor drum 110 with penetration plates 804, 805 settling a lane of cracked paving.

It will be noted that FIG. 17a shows a bi-directional drum 110 being used. By doing short sections of lane, for example 20 meters, and then reversing along the same lane, more accurate placement of the compaction blows is possible along the selected lanes. Furthermore it is found in practice that a paved surface of uniform appearance is seldom of uniform strength and the number of passes of the impact compactor which is required to produce the required cracked lane, will vary. Doing the work in short sections using a bi-directional impact drum 110 produces the best result with the most economical number of compaction passes.

It will be appreciated that a variety of different removable penetration plates can be used.

It should also be appreciated that the actual impact drum(s) of the impact compactor in accordance with the invention could be driven. In other words, the drums may be powered by a driving mechanism.

The bi-directional self-propelled impact compactor 10 can be made more versatile by providing the additional capability of converting the compactor drums 110 into round roller drums, by way of mounting specially designed conversion arrangements. Each conversion arrangement includes an elongate, curved conversion member/plate 820 (see FIGS. 18a and 18b). An elongate, operatively inner side 822 of each conversion member 820 is concavely curved such that it can fit against, and extend along, a compaction portion 118 of the compactor drum 110 between two re-entrant points 114, 116. Conversion member 820 is securable to the radially outer surface 810 of the compactor drum 110 by means of bolts 824 which extend through holes 826 which are provided in the conversion member 820 and into the compactor drum 110. A curved, outer side 830 of the conversion member 820 is shaped such that, together with the outer sides 830 of the other conversion members 820 forms a generally circular profile. Therefore, when the conversion members 820 are secured to the drum 110, it is effectively converted from a compactor drum to a round drum which does not produce periodic impact blows when being rolled along the surface 100. In this configuration, the converted drum 110 will typically be able to provide static compaction (instead of impact compaction).

In unconverted form, the compactor drums 110 can produce undulations on the soil surface 100 which may need to be smoothed with a grader/leveller arrangement (as described above). The soil loosened by the grader may then need to be compacted with a round roller in order to achieve the required compaction within the top layer of the soil. With these specially designed conversion members 820, it is possible to achieve the required compaction specifications without requiring a separate circular compaction roller. In other words, the compactor drum 110 (in unconverted form) can first be used to achieve the required compaction at depth and the specially designed conversion members 820 can then be mounted onto the compactor drum 110 to create a round roller which can then compact the top layer of soil to the required compaction specification.

This achieves substantial cost savings because it obviates the need to have more than one roller on a construction site in order to carry out the required compaction.

The invention claimed is:

1. A bi-directional impact compactor, comprising:
a first part on which at least one non-round compactor drum is rotatably mounted;
a second part which is connected to, and movable relative to, the first part; and
a damping arrangement which is connected between the first and second parts and which is configured to provide a damping function for the relative movement between the first and second parts,
wherein the damping arrangement includes,
an outer tubular member which defines a non-circular inner channel/passage,
a non-circular inner shaft member which defines a first axis of rotation and which is positioned, at least partially, in the channel/passage defined by the outer tubular member, and
at least one wedge formation which is wedged between the shaft member and the tubular member,
wherein the wedge formation is at least partially resiliently deformable and is configured to resist/oppose relative rotation between the shaft member and the tubular member about the first axis of rotation,
wherein one of the members is connected to the first part, while the other member is connected to the second part,
wherein the non-round compactor drum includes a non-round compactor drum body which is rotatable about an axis of rotation and which is shaped to produce, under a weight of the non-round compactor drum, a series of impact blows on a ground surface over which the non-round compactor drum rolls, when the non-round compactor drum is rolled in both a first direction and an opposite second direction along the ground surface, wherein the body has a radially outer part which extends circumferentially around the axis of rotation and which, in use, engages a ground surface as the body rolls there along during a surface compaction process, wherein the outer part includes at least one salient point/portion which allows the non-round compactor drum, during use, to produce a series of periodic impact blows on a soil surface over which the non-round compactor drum rolls by rising onto the at least one salient point/portion and thereafter dropping/falling down in order to produce an impact blow on the surface over which the non-round compactor drum travels, and wherein the outer part includes,
- a first re-entrant/concave portion which immediately follows the at least one salient point/portion as the non-round compactor drum rolls on the surface in the first direction in order to facilitate the production of the impact blows when the non-round compactor drum is rolled in the first direction, and
- a second re-entrant/concave portion which immediately follows the at least one salient point/portion as the non-round compactor drum rolls on the surface in the second direction in order to facilitate the production of the impact blows when the non-round compactor drum is rolled in the second direction.

2. The impact compactor of claim 1,
wherein the wedge formation is made from an elastic polymeric substance.

3. The impact compactor of claim 1,
wherein the damping arrangement includes a plurality of wedge formations, which wedge formations are spaced around an outer periphery of the inner shaft member and are wedged between the inner shaft member and the outer tubular member.

4. The impact compactor of claim 3,
wherein the channel defined by the outer tubular member has a polygonal shape, when seen in transverse cross-section.

5. The impact compactor of claim 4,
wherein the channel includes three or more corners, when seen in transverse cross-section and wherein a wedge formation is located in one or more of the corners.

6. The impact compactor of claim 5,
wherein a wedge formation is located in at least two corners.

7. The impact compactor of claim 5,
wherein the inner shaft and the channel of the outer tubular member are both square, when seen in transverse cross-section, wherein the damping arrangement includes four wedge formations which are located in respective corners of the channel, and
wherein, when seen in transverse cross-section, the square-shaped channel of the outer tubular member and square-shaped inner shaft member are oriented at an angle of between 30° and 45° relative to each other such that planar sides of the inner shaft member therefore face the respective corners of the channel, when seen in transverse cross-section.

8. The impact compactor of claim 1,
wherein the wedge formation(s) is/are elongate and extend(s) along at least part of the length of the channel defined by the outer tubular member.

9. The impact compactor of claim 1, further comprising:
a chassis structure; and
a first link, wherein the at least one non-round compactor drum is pivotally mounted to the chassis structure via the first link, and wherein the non-round compactor drum is rotatably mounted to the first link by means of a compactor drum mounting arrangement.

10. The impact compactor of claim 9,
wherein the first link is configured to allow displacement of the non-round compactor drum, relative to the chassis structure, between a lowered and a raised position.

11. The impact compactor of claim 10,
wherein the damping arrangement includes a second link and a coupling arrangement which is configured to couple the chassis structure to a drive unit, for driving the impact compactor along a surface, wherein the coupling arrangement is pivotally connected to the chassis structure via the second link, and
wherein the second link is spaced from the first link.

12. The impact compactor of claim 11,
wherein one of the members of the damping arrangement is connected to the second link, while the other member is connected to the coupling arrangement or the chassis structure.

13. The impact compactor of claim 10,
wherein one of the members of the damping arrangement is connected to the chassis structure, while the other member is connected to the first link.

14. The impact compactor of claim 13,
wherein the outer tubular member is connected to the first link while the inner shaft member is connected to the chassis structure.

15. The impact compactor of claim 13,
wherein the outer tubular member is connected to the chassis structure while the inner shaft member is connected to the first link.

16. The impact compactor of claim 11,
wherein the coupling arrangement is configured to couple the chassis structure movably to the drive unit, for driving the impact compactor along a surface, such that the chassis structure can move relative to the drive unit about a second axis.

17. The impact compactor of claim 16,
wherein the coupling arrangement includes a restriction mechanism which is configured to restrict the relative movement between the chassis structure and the drive unit about the second axis.

18. The impact compactor of claim 17,
wherein the restriction mechanism is a braking mechanism which is configured to limit the movement of the chassis structure relative to the drive unit about the second axis, when the impact compactor is in an inoperative, transport configuration, and
wherein the second axis extends along a forward driving/travel direction of the impact compactor.

* * * * *